US008475021B2

(12) United States Patent
Iwasaki et al.

(10) Patent No.: US 8,475,021 B2
(45) Date of Patent: Jul. 2, 2013

(54) VEHICLE LIGHTING DEVICE

(75) Inventors: Kazunori Iwasaki, Isehara (JP); Yoshihiro Sugie, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 132 days.

(21) Appl. No.: 13/097,607

(22) Filed: Apr. 29, 2011

(65) Prior Publication Data

US 2011/0280030 A1 Nov. 17, 2011

(30) Foreign Application Priority Data

May 12, 2010 (JP) ................................ 2010-110109

(51) Int. Cl.
*F21V 19/00* (2006.01)
*B60Q 1/00* (2006.01)

(52) U.S. Cl.
USPC ............................ 362/519; 362/281; 362/514

(58) Field of Classification Search
USPC ................. 362/235, 238, 241, 512, 514, 518, 362/519, 543, 544, 545, 281, 283
See application file for complete search history.

(56) References Cited

U.S. PATENT DOCUMENTS 6,814,475 B2 * 11/2004 Amano ......................... 362/487
6,976,775 B2 * 12/2005 Koike ........................... 362/545
7,178,960 B2 * 2/2007 Ishida ........................... 362/517
7,311,430 B2 * 12/2007 Tsukamoto et al. .......... 362/545
7,850,353 B2 * 12/2010 Ota et al. ...................... 362/545
7,862,217 B2 * 1/2011 Suzuki et al. ................. 362/545
8,123,377 B2 * 2/2012 Lundberg et al. ............. 362/243
8,201,980 B2 * 6/2012 Ookubo et al. ............... 362/517
8,210,717 B2 * 7/2012 Medendorp, Jr. et al. ........................ 362/249.02
8,240,896 B2 * 8/2012 Abe ............................. 362/514
8,246,227 B2 * 8/2012 Okubo et al. ................. 362/514
8,292,480 B2 * 10/2012 Koizumi et al. .............. 362/545
2001/0015898 A1 * 8/2001 Natsume ....................... 362/520
2003/0063476 A1 * 4/2003 English et al. ................ 362/545
2004/0120160 A1 * 6/2004 Natsume ....................... 362/544
2006/0120094 A1 * 6/2006 Tsukamoto et al. .......... 362/518
2009/0097247 A1 * 4/2009 Tseng et al. .................. 362/241

FOREIGN PATENT DOCUMENTS

JP 2006-024509 A 1/2006

* cited by examiner

*Primary Examiner* — John A Ward
(74) *Attorney, Agent, or Firm* — Foley & Lardner LLP

(57) ABSTRACT

According to the present invention, additional reflection surfaces 9UL, 9UR, 9DL, 9DR are provided for reflecting light L6 from semiconductor-type light sources 5U, 5D on intermediate invalid reflection surfaces 9, 9L, 9R. As a result, the present invention is capable of: reflecting the light L6 from the semiconductor-type light sources 5U, 5D on the intermediate invalid reflection surfaces 9, 9L, 9R, by means of the additional reflection surfaces 9UL, 9UR, 9DL, 9DR; illuminating the intermediate invalid reflection surfaces 9, 9L, 9R; and lessening a dark part.

6 Claims, 21 Drawing Sheets

VEHICLE LIGHTING DEVICE

CROSS REFERENCE TO RELATED APPLICATIONS

This application claims priority of Japanese Patent Application No. 2010-110109 filed on May 12, 2010. The contents of this application are incorporated herein by reference in their entirety.

BACKGROUND OF THE INVENTION

1. Field of the Invention

The present invention relates to a vehicle lighting device which is comprised of two light source/reflection surface units.

2. Description of the Related Art

A vehicle lighting device of such type is conventionally known (for example, Japanese Patent Application Laid-open No. 2006-24509). Hereinafter, a conventional vehicle lighting device will be described. In the conventional vehicle lighting device, a light emitting unit for lighting device is comprised of: an LED as a light source; and a reflection surface for reflecting light from the LED with a predetermined light distribution pattern, and two light emitting units for lighting device are disposed at a top and a bottom of the lighting device. Hereinafter, functions of the conventional vehicle lighting device will be described. When the top and bottom LEDs are illuminated to emit light, the light beams from the top and bottom LEDs are reflected on top and bottom reflection surfaces, respectively, and the reflected light is emitted as a predetermined light distribution pattern.

However, in the conventional vehicle lighting device, two light emitting units for lighting device, a respective one of which is comprised of an LED and a reflection surface, are disposed at the top and the bottom of the lighting device. Therefore, in the conventional vehicle lighting device, a nonluminous portion to which the light beams from the top and bottom LEDs are disallowed to be incident, i.e., a dark part may be formed between the top and bottom light emitting units for lighting device.

The problem to be solved by the present invention is that, in the conventional vehicle lighting device, a nonluminous portion to which the light beams from the top and bottom LEDs are disallowed to be incident, i.e., a dark part may be formed between the top and bottom light emitting units for lighting device.

SUMMARY OF THE INVENTION

A vehicle lighting device of claim 1 in the present invention which is comprised of two light source/reflection surface units, said device comprising:

a first light source/reflection surface unit which is comprised of a first semiconductor-type light source and a first reflection surface for reflecting and emitting light from the first semiconductor-type light source as a predetermined light distribution pattern;

a second light source/reflection surface unit which is comprised of a second semiconductor-type light source and a second reflection surface for reflecting and emitting light from the second semiconductor-type light source as a predetermine light distribution pattern;

a holder which is disposed between the first light source/reflection surface unit and the second light source/reflection source unit and by which the first light source/reflection surface unit and the second light source/reflection surface unit are held;

an intermediate invalid reflection surface which is continuously provided between the first reflection surface and the second reflection surface and to which the light from the first semiconductor-type light source and the light from the second semiconductor-type light source are disallowed to be incident; and an additional reflection surface for reflecting to the intermediate invalid reflection surface, the light from the first semiconductor-type light source and the light from the second semiconductor-type light source.

The vehicle lighting device of claim 2 in the present invention, wherein:

the first reflection surface is made of: a first fixed reflection surface which is provided at a fixed reflector; and a first movable reflection surface which is provided at a movable reflector;

the second reflection surface is made of: a second fixed reflection surface which is provided at a fixed reflector; and a second movable reflection surface which is provided at a movable reflector;

the first fixed reflection surface and the second fixed reflection surface are comprised of: a fixed reflection surface for first light distribution pattern, for reflecting and emitting a predetermined first light distribution pattern, when the movable reflector is positioned in a first location; and a fixed reflection surface for second light distribution pattern, for reflecting and emitting a predetermined second light distribution pattern, when the movable reflector is positioned in a second location;

the first movable reflection surface and the second movable reflection surface are comprised of a movable reflection surface for second light distribution pattern, for reflecting and emitting a predetermined second light distribution pattern, when the movable reflector is positioned in a second location;

the intermediate invalid reflection surface is continuously provided between the fixed reflection surface for the second light distribution pattern, which is more outside than the fixed reflection surface for first light distribution pattern of the first fixed reflection surface, and the fixed reflection surface for the second light distribution pattern, which is more outside than the fixed reflection surface for first light distribution pattern of the second fixed reflection surface; and the additional reflection surface is positioned in a range other than a high energy range in energy distribution of the first semiconductor-type light source and the second semiconductor-type light source of the movable reflector, when the movable reflector is positioned in the second location.

The vehicle lighting device of claim 3 in the present invention, wherein:

the first reflection surface is made of a first fixed reflection surface which is provided at a fixed reflector;

the second reflection surface is made of a second fixed reflection surface which is provided at a fixed reflector;

the first fixed reflection surface and the second fixed reflection surface are comprised of a reflection surface for reflecting and emitting a predetermined light distribution pattern;

the intermediate invalid reflection surface is continuously provided between the first fixed reflection surface and the second fixed reflection surface; and the additional reflection surface is positioned in a range other than a high energy range in energy distribution of the first semiconductor-type light source and the second semiconductor-type light source, of the fixed reflector.

The vehicle lighting device of claim 4 in the present invention, wherein the fixed reflector and the movable reflector is formed in a shape of a rotating parabolic face. The vehicle lighting device of claim 5 in the present invention, wherein the fixed reflector is formed in a shape of a rotating parabolic face.

In the vehicle lighting device of the present invention (the invention according to claim 1), by means for solving the problem described previously, if a first semiconductor-type light source and a second semiconductor-type light source are illuminated to emit light, a major part of light that is radiated from the first semiconductor-type light source is reflected and emitted as a predetermined light distribution pattern on a first reflection surface; and a major part of light that is radiated from a second semiconductor-type light source is reflected and emitted as a predetermined light distribution pattern on a second reflection surface. Moreover, in the vehicle lighting device of the present invention (the invention according to claim 1), a remaining portion of a respective one of the light beams that are radiated from the first semiconductor-type light source and the second semiconductor-type light source is reflected on an additional reflection surface and then the reflected light is incident to an intermediate invalid reflection surface, so that the intermediate invalid reflection surface between the first reflection surface and the second reflection surface is allowed to be luminous. As a result, the vehicle lighting device of the present invention (the invention according to claim 1) is capable of eliminating a dark part between the first reflection surface and the second reflection surface. In other words, the vehicle lighting device of the present invention (the invention according to claim 1) is capable of substantially entirely illuminate the intermediate invalid reflection surface between the first reflection surface and the second reflection surface, the first reflection surface, and the second reflection surface. In this manner, the vehicle lighting device of the present invention (the invention according to claim 1) is improved in quality, is also improved in visual recognition property, and further, is improved in appearance, in comparison with the conventional vehicle lighting device in which a nonluminous dark part may be formed between top and bottom light emitting units for lighting device.

In addition, in the vehicle lighting device of the present invention (the invention according to claim 2), by means for solving the problem described above, when a movable reflector is positioned in a first location, a predetermined first light distribution pattern is reflected and emitted from a fixed reflection surface for first light distribution pattern of a first fixed reflection surface and a second fixed reflection surface; and when the movable reflector is positioned in a second location, a predetermined second light distribution pattern is reflected and emitted from a respective one of a fixed reflection surface for second light distribution pattern of the first fixed reflection surface and the second fixed reflection surface and a movable reflection surface for second light distribution pattern of a first movable reflection surface and a second movable reflection surface. Moreover, in the vehicle lighting device of the present invention (the invention according to claim 2), when the movable reflector is positioned in a second location, a part of light beams that are radiated from a first semiconductor-type light source and a second semiconductor-type light source is reflected on an additional reflection surface and then the reflected light is incident to an intermediate invalid reflection surface, so that the intermediate invalid reflection surface can be illuminated between a fixed reflection surface for second light distribution pattern, which is more outside than the fixed reflection surface for first light distribution pattern of the first fixed reflection surface, and a fixed reflection surface for second light distribution pattern, which is more outside than the fixed reflection surface for first light distribution pattern of the second fixed reflection surface. As a result, the vehicle lighting device of the present invention (the invention according to claim 2) is capable of eliminating a dark part between the fixed reflection surface for second light distribution pattern, which is more outside than the fixed reflection surface for first light distribution pattern of the first fixed reflection surface, and the fixed reflection surface for second light distribution pattern, which is more outside than the fixed reflection surface for first light distribution pattern of the second fixed reflection surface. In other words, the vehicle lighting device of the present invention (the invention according to claim 2) is capable of substantially entirely illuminating: the fixed reflection surface for second light distribution pattern of the first fixed reflection surface; the fixed reflection surface for second light distribution pattern of the second fixed reflection surface; and the intermediate invalid reflection surface between the fixed reflection surface for second light distribution pattern, which is more outside than the fixed reflection surface for first light distribution pattern of the first fixed reflection surface, and the fixed reflection surface for second light distribution pattern, which is more outside than the fixed reflection surface for first light distribution pattern of the second fixed reflection surface. In this manner, the vehicle lighting device of the present invention (the invention according to claim 2) is improved ins quality, is also improved in visual recognition property, and further, is improved in appearance, in comparison with the conventional vehicle lighting device in which a nonluminous dark part may be formed between top and bottom light emitting units for lighting device.

In particular, in the vehicle lighting device of the present invention (the invention according to claim 2), an additional reflection surface is positioned in a range other than a high energy range in energy distribution of a first semiconductor-type light source and a second semiconductor-type light source of a movable reflector when it is positioned in a second location. As a result, in the vehicle lighting device of the present invention (the invention according to claim 2), when the movable reflector is positioned in the second location, the light beams with high energy in energy distribution of the first semiconductor-type light source and the second semiconductor-type light source is disallowed to be interfered with the additional reflection surface from being incident to the fixed reflection surface for second light distribution pattern of the first fixed reflection surface and the second fixed reflection surface and the movable reflection surface for second light distribution pattern of the first movable reflection surface and the second movable reflection surface, respectively. In the vehicle lighting device of the present invention (the invention according to claim 2), when the movable reflector is positioned in the second location, the light beams with high energy in energy distribution of the first semiconductor-type light source and the second semiconductor-type light source are reliably incident to the fixed reflection surface for second light distribution pattern of the first fixed reflection surface and the second fixed reflection surface and the movable reflection surface for second light distribution pattern of the first movable reflection surface and the second movable reflection surface, respectively. Thus, the light quantity (lightness, luminance, luminous flux) of the predetermined second light distribution pattern is disallowed to be decreased by means of the additional reflection surface.

Moreover, in the vehicle lighting device of the present invention (the invention according to claim 2), an additional reflection surface is positioned in a range other than a high energy range in energy distribution of a first semiconductor-type light source and a second semiconductor-type light source of a movable reflector when it is positioned in a second location. As a result, in the vehicle lighting device of the present invention (the invention according to claim 2), when the movable reflector is positioned in a first location, a respective one of light beams from the first semiconductor-type light source and the second reflector-type light source is disallowed to be interfered with the additional reflection surface from being incident to the fixed reflection surface for first light distribution pattern of the first fixed reflection surface and the second fixed reflection surface. In this manner, in the vehicle lighting device of the present invention (the invention according to claim 2), when the movable reflector is positioned in the first location, the respective one of the light beams from the first semiconductor-type light source and the second semiconductor-type light source is reliably incident to the fixed reflection surface for first light distribution pattern of the first fixed reflection surface and the second fixed reflection surface. Thus, the light quantity (lightness, luminance, luminous flux) of the predetermined first light distribution pattern is disallowed to be decreased on the additional reflection surface.

Further, in the vehicle lighting device of the present invention (the invention according to claim 3), by means for solving the problem described previously, if a first semiconductor-type light source and a second semiconductor-type light source are illuminated to emit light, a major part of light beams that are radiated from the first semiconductor-type light source and the second semiconductor-type light source are reflected and emitted as a predetermined light distribution pattern on a first fixed reflection surface and a second fixed reflection surface. Moreover, in the vehicle lighting device of the present invention (the invention according to claim 3), a remaining part of a respective one of the light beams that are radiated from the first semiconductor-type light source and the second semiconductor-type light source is reflected on an additional reflection surface and then the reflected light is incident to an intermediate invalid reflection surface, so that the intermediate invalid reflection surface between the first fixed reflection surface and the second fixed reflection surface can be illuminated. As a result, the vehicle lighting device of the present invention (the invention according to claim 3) is capable of eliminating a dark part between the first fixed reflection surface and the second fixed reflection surface. In other words, in the vehicle lighting device of the present invention (the invention according to claim 3) is capable of substantially entirely illuminate the first fixed reflection surface, the second fixed reflection surface, and the intermediate invalid reflection surface between the first fixed reflection surface and the second fixed reflection surface. In this manner, the vehicle lighting device of the present invention (the invention according to claim 3) is improved in quality, is also improved in visual recognition property, and further, is improved in appearance, in comparison with the conventional vehicle lighting device in which a nonluminous dark part may be formed between top and bottom light emitting units for lighting device.

In particular, in the vehicle lighting device of the present invention (the invention according to claim 3), an additional reflection surface is positioned in a range other than a high energy range in energy distribution of a first semiconductor-type light source and a second semiconductor-type light source of a fixed reflector. As a result, in the vehicle lighting device of the present invention (the invention according to claim 3), light beams with high energy in energy distribution of the first semiconductor-type light source and the second semiconductor-type light source is disallowed to be interfered with the additional reflection surface from being incident to the first fixed reflection surface and the second fixed reflection surface, respectively. In this manner, in the vehicle lighting device of the present invention (the invention according to claim 3), the light beams in energy distribution of the first semiconductor-type light source and the second semiconductor-type light source are reliably incident to the first fixed reflection surface and the second fixed reflection surface, respectively. Thus, the light quantity (lightness, luminance, luminous flux) of the predetermined light distribution pattern is disallowed to be decreased by means of the additional reflection surface.

Furthermore, in the vehicle lighting device of the present invention (the invention according to claim 4 or 5), the fixed reflector and the movable reflector according to claim 2 or the fixed reflector according to claim 3 are formed in the shape of a rotating parabolic face. Therefore, in the vehicle lighting device of the present invention (the invention according to claim 4), a part of the light beams that are radiated from the first semiconductor-type light source and the second semiconductor-type light source can be cross-reflected easily and reliably on an intermediate invalid reflection surface by means of an additional reflection surface.

DESCRIPTION OF THE PREFERRED EMBODIMENTS

Figure 16:
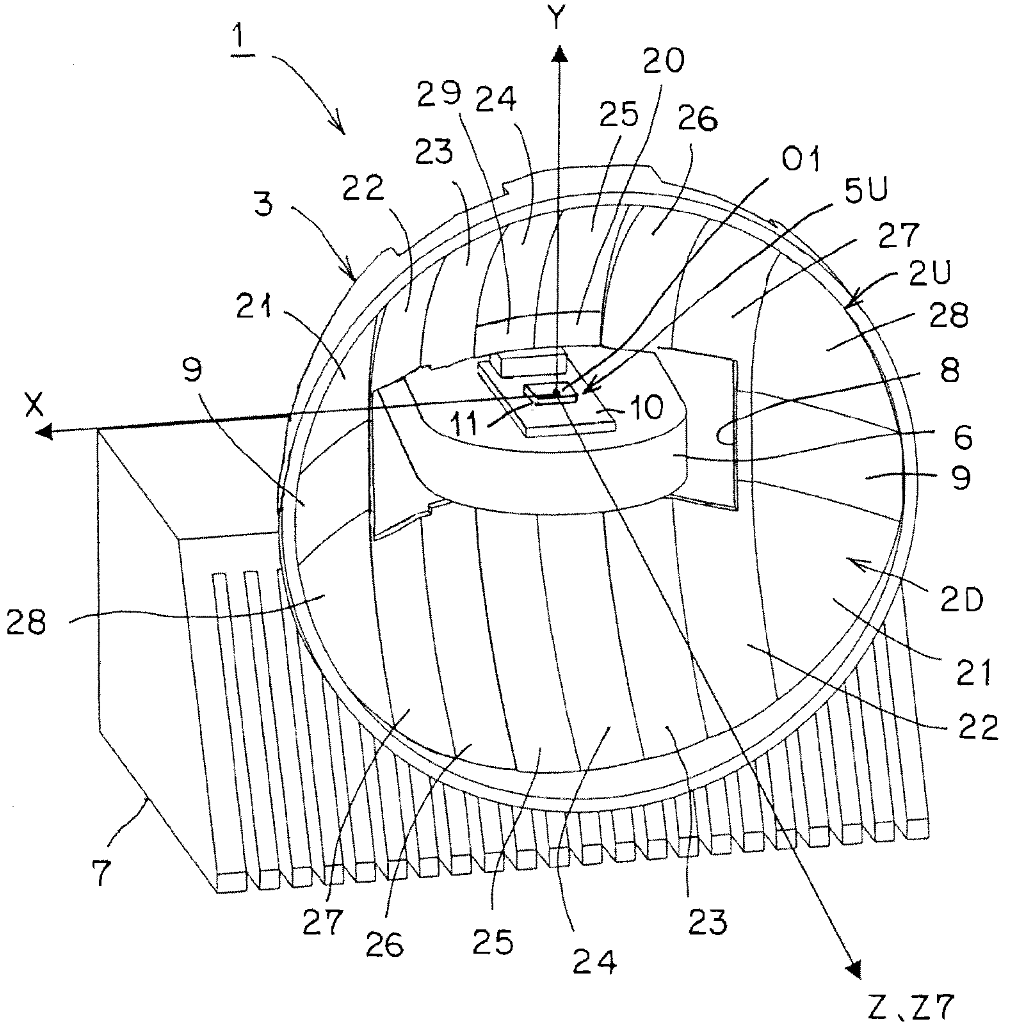
FIG. 16 is a perspective view showing essential parts when the upside movable reflector, the downside movable reflector, and a drive unit are not shown, similarly.
Figure 25:
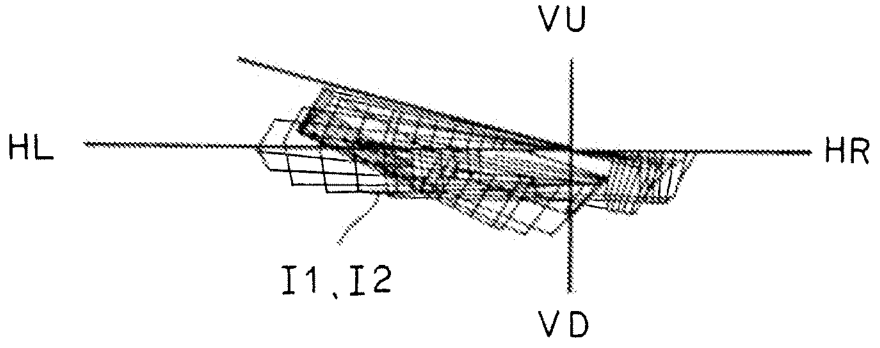
FIG. 25 is an explanatory view showing a reflection image group of a light emitting chip, obtained by means of the first reflection surface made of the fourth segment, similarly.
Figure 26:
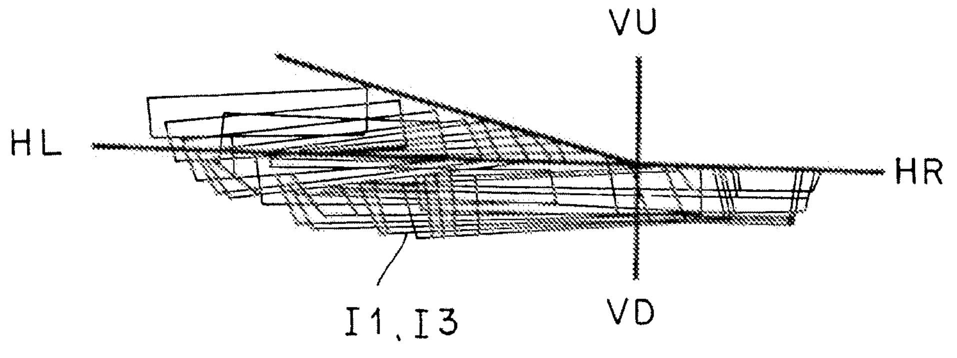
FIG. 26 is an explanatory view showing a reflection image group of a light emitting chip, obtained by means of the second reflection surface made of the fifth segment, similarly.

Hereinafter, embodiments of a vehicle headlamp according to the present invention will be described in detail, referring to the drawings. In the drawings, the letter sign "VU-VD" designates a vertical line of a top and a bottom of a screen; and the letter sign "HL-HR" designates a horizontal line of a left and a right of the screen. FIGS. 25 and 26 are explanatory views showing a reflection image group of a light emitting chip on the screen obtained by computer simulation. In the specification and claims, the terms "top", "bottom", "front", "rear", "left", and "right" designate the top, bottom, front, rear, left, and right of a vehicle when the vehicle headlamp according to the present invention is mounted on a vehicle (automobile). In addition, in FIGS. 16, 17, and 18, in order to clarify a structure of the invention, an upside movable reflector 13U, a downside movable reflector 13D, and a drive unit 14 are not shown. Further, in FIGS. 1 to 3, and 8 to 11 a fin shape of a heat sink 7 is not shown.

First Embodiment (Configuration of Vehicle Lighting Device)

FIGS. 1 to 28 are showing the embodiment 1 of vehicle lighting device on the present the invention. Hereinafter, a configuration of a vehicle lighting device in the embodiment will be described. In the figures, reference numeral 1 denotes a vehicle lighting device (vehicle headlamp) in the embodiment. The vehicle lighting device 1 illuminates light toward a forward direction of a vehicle by changing: a light distribution pattern for low beam passing (light distribution pattern for passing: first light distribution pattern), shown in FIG. 27; a light distribution pattern for high beam (light distribution pattern for cruising: second light distribution pattern), shown in FIG. 28.

Figure 27:
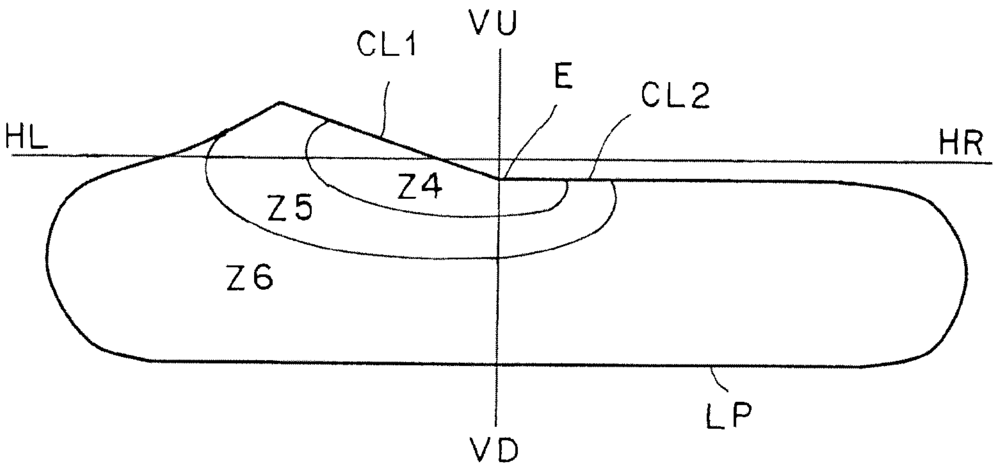
FIG. 27 is an explanatory view showing a light distribution pattern for low beam, having an oblique cutoff line and a horizontal cutoff line, similarly.

The light distribution pattern LP for low beam having, shown in FIG. 27, an oblique cutoff line CL1 on a cruising lane side (left side) and a horizontal cutoff line CL2 on an opposite lane side (right side) with an elbow point E being a boundary. An angle fondled between the oblique cutoff line CL1 and a horizontal line HL-HR of a screen is about 15 degrees. The light distribution pattern for high beam includes, shown in FIG. 28, a first light distribution pattern HP1 for high beam, a second light distribution pattern HP2 for high beam, a third light distribution pattern HP3 for high beam, and a light distribution pattern LP1 for dimming low beam.

The vehicle lighting device 1 is made up of: a fixed reflector 3 having an upside reflecting surface 2U (a first reflection surface, a first fixed reflection surface) and a downside reflecting surface 2D (a second reflection surface, a second fixed reflection surface) made of a parabola-based free curved face (NURBS-curved face); upside and downside movable reflectors 13U and 13D having upside and downside reflecting surfaces 12U (a first reflection surface, a first movable reflection surface, a movable reflection surface for second light distribution pattern) and 12D (a second reflection surface, a second movable reflection surface, a movable reflection surface for second light distribution pattern) made of a parabola-based free curved face (NURBS-curved face), similarly; an upside semiconductor-type light source 5U (a first semiconductor-type light source) and a downside semiconductor-type light source 5D (a second semiconductor-type light source) having a light emitting chip of a planar rectangle shape (planar elongated shape); a holder 6; a heat sink member 7; a drive unit 14; and a lamp housing and a lamp lens (such as a transparent outer lens, for example), although not shown.

The holder 6 is shaped like a plate having a top fixing face and a bottom fixing face. The holder 6 is made up of a resin member or a metal member with high thermal conductivity, for example. The heat sink member 7 is formed in a trapezoidal shape having an upper fixing face at its upper part, and is shaped like a fin from an intermediate part to a lower part. The heat sink member 7 is made up of a resin member or a metal member with high thermal conductivity, for example.

The fixed reflector 3, the upside movable reflector 13U, the downside movable reflector 13D, the upside semiconductor-type light source 5U, the downside semiconductor-type light source 5D, the holder 6, the heat sink member 7, and the drive unit 14 constitute a lamp unit. In other words, the fixed reflector 3 is fixed and held on the holder 6. The upside movable reflector 13U and the downside movable reflector 13D are rotatably mounted on the holder 6 around a horizontal axis X. The upside semiconductor-type light source 5U is fixed and held on the top fixing face of the holder 6. The downside semiconductor-type light source 5D is fixed and held on the bottom fixing face of the holder 6. The holder 6 is fixed and held on the top fixing face of the hear sink member 7. The drive 6 is fixed and held on a top fixing face of the heat sink member 7. The drive unit 14 is fixed and held on the top fixing face of the holder 6 and the heat sink member 7

The lamp units 3, 5U, 5D, 6, 7, 13U, 13D, 14 are disposed via an optical-axis adjustment mechanism, for example, in a lamp room partitioned by the lamp housing and the lamp lens. In the lamp room, apart from the lamp units 3, 5U, 5D, 6, 7, 13U, 13D, 14, other lamp units such as a fog lamp, a cornering lamp, a clearance lamp, and a turn signal lamp may be disposed.

Figure 17:
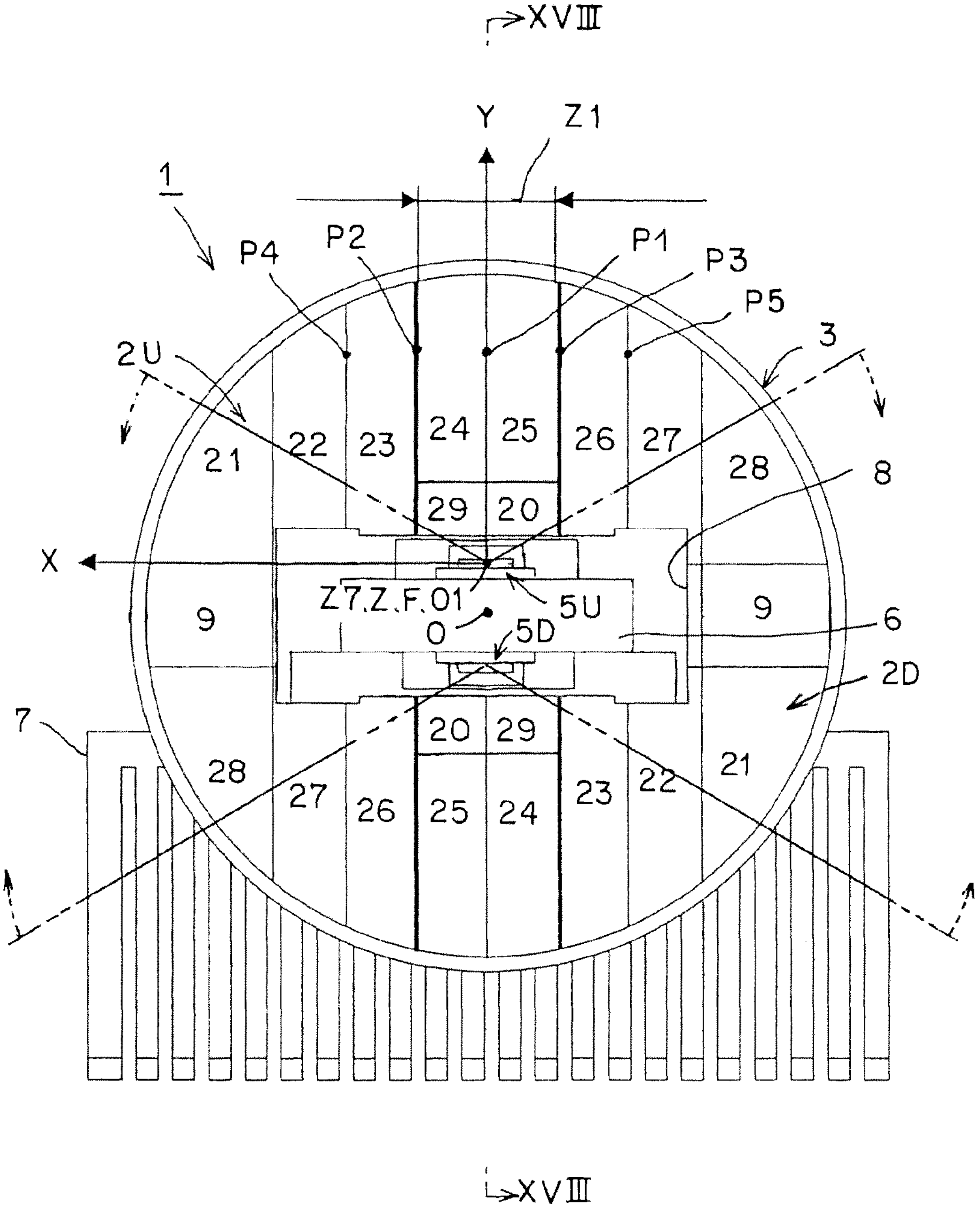
FIG. 17 is a front view showing essential parts when the upside movable reflector, the downside movable reflector, and the drive unit are not shown, similarly.

The upside reflecting surface 2U of the fixed reflector 3; the upside reflecting surface 12U of the upside movable reflector 13U; and the upside semiconductor-type light source 5U constitutes an upside unit (a first light source and reflecting surface unit) in which a light emitting face of the light emitting chip 4 is oriented upward in a vertical-axis Y direction. In addition, the downside reflecting surface 2D of the fixed reflector 3; the downside reflecting surface 12D of the downside movable reflector 13D; and the downside semiconductor-type light source 5D constitutes a downside unit (a second light source and reflecting surface unit) in which a light emitting face of the light emitting chip 4 is oriented downward in a vertical-axis Y direction. The upside units 2U, 5U, 12U, 13U and the downside units 2D, 5D, 12D, 13D, as shown in FIG. 17, are disposed in a point-symmetrical state with a point O being a center. A reflecting surface design of the upside reflecting surfaces 2U, 12U and a reflecting surface design of the downside reflecting surfaces 2D, 12D are not merely point-symmetrical (inverted).

The fixed reflector 3 is made up of an optically opaque resin member or the like, for example. The fixed reflector 3 is substantially shaped like a rotational parabola-based face while an axis passing through the point-symmetrical point O is defined as a rotary axis. A front side of the fixed reflector 3 is opened in a substantial circle. On the other hand, a rear side of the fixed reflector 3 is closed. An elongated, substantially rectangular window portion 8 is provided at an intermediate part of the closed portion of the fixed reflector 3. The holder 6 is inserted into the window portion 8 of the fixed reflector 3. The fixed reflector 3 is fixed and held on the holder 6 at the outside (rear side) of the closed portion.

Of the inside (front side) of the closed portion of the fixed reflector 3, the upside reflecting surface 2U and the downside reflecting surface 2D are provided, respectively at the upside and downside of the window portion 8. The upside reflecting surface 2U and the downside reflecting surface 2D made of a parabola-based free curved face (NURBS-curved face) has a reference focal point (pseudo-focal point) F and a reference optical axis (pseudo-optical axis) Z. An intermediate invalid reflection surface 9 is continually provided between the upside reflecting surface 2U and the downside reflecting surface 2D and at both the left and right sides of the window portion 8 of the inside (front side) of the closed portion of the fixed reflector 3. The intermediate invalid reflection surface 9 is a surface to which light beams (direct light beams) from the upside semiconductor-type light source 5U and the downside semiconductor-type light source 5D are disallowed to be incident.

The upside reflecting surface 2U and the downside reflecting surface 2D of the fixed reflector 3 are made up of: a reflecting surface for low beam (a fixed reflection surface for first light distribution pattern and a fixed reflection surface for second light distribution pattern), forming the light distribution pattern LP for low beam and the light distribution pattern LP1 for dimming low beam; and a first reflecting surface for high beam (a fixed reflection surface for second light distribution pattern) and a second reflecting surface for high beam (a fixed reflection surface for second light distribution pattern), forming the first light distribution pattern HP1 for high beam and the second light distribution pattern HP2 for high beam.

The drive unit 14 is made up of a motor 15, a drive force transmission mechanism 16, and a spring for returning a mobile reflector (not shown). The motor 15 is directly fixed and held on the top fixing face of the heat sink member 7. In this manner, a heat generated at the time of supplying power to the motor 15 can be radiated (dissipated) to the outside at the heat sink member 7. The drive force transmission mechanism 16 is provided between the motor 15 and a respective one of the upside movable reflector 13U and the downside movable reflector 13D The drive unit 14 rotates the upside movable reflector 13U and the downside movable reflector 13D with respect to the holder 6 around the horizontal-axis X between a first location (the location in a state shown in FIGS. 8, 10, 12, and 14) and a second location (the location in a state shown in FIGS. 1 to 3, 9, 11, 13, and 15).

The upside movable reflector 13U and the downside movable reflector 13D are made up of an optically opaque resin member, for example. The upside movable reflector 13U and the downside movable reflector 13D, positioned in the second location, are substantially shaped like a rotational parabola-based face while an axis passing through the point-symmetrical point O is defined as a rotary axis. The front sides of the upside movable reflector 13U and the downside movable reflector 13D, positioned in the second location, are opened in a substantial circle. The size of the opening, i.e., an opening area at the front side of the upside movable reflector 13U and the downside movable reflector 13D is smaller than that of the opening, i.e., an opening area at the front side of the fixed reflector 3.

Semicircular through holes 17 are provided at central parts of the upside movable reflector 13U and the downside movable reflector 13D, respectively. In addition, rectangular visor portions 18 are integrally provided at intermediate parts of the peripheral parts of the upside movable reflector 13U and the downside movable reflector 13D, respectively. The upside reflecting surface 12U and the downside reflecting surface 12D are provided on faces opposite to the upside semiconductor-type light source 5U of the upside movable reflector 13U and the downside semiconductor-type light source 5D of the downside movable reflector 13D, respectively. The upside reflecting surface 12U and the downside reflecting surface 12D that are made of a parabola-based free curved face (NURBS-curved face) has a reference focal point (pseudo-focal point) F1 and a reference optical axis (pseudo-optical axis) Z7.

The upside reflecting surface 12U of the upside movable reflector 13U and the downside reflecting surface 12D of the downside movable reflector 13D are made of a third reflecting surface for high beam, forming the third light distribution pattern HP3 for high beam.

Figure 19:
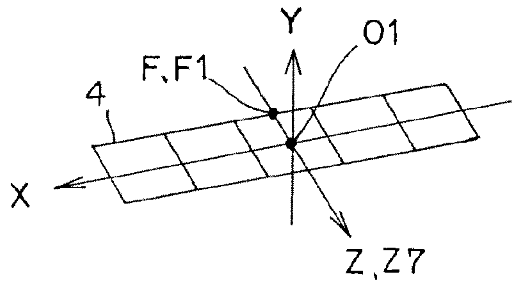
FIG. 19 is an explanatory perspective view showing a relative position relationship between a center of a light emitting chip and a reference focal point of a reflection surface, similarly.
Figure 20:
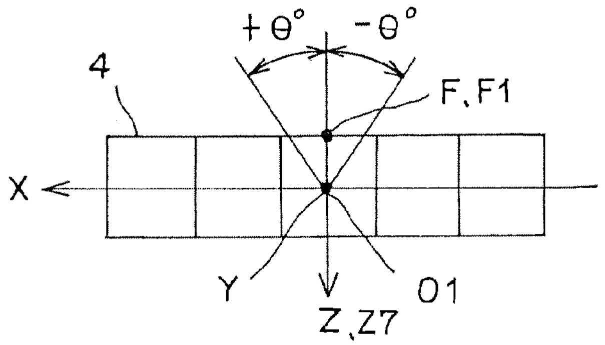
FIG. 20 is an explanatory plan view showing the relative position relationship between the center of the light emitting chip and the reference focal point of the reflection surface, similarly.

The semiconductor-type light sources 5U, 5D are made up of: a board 10: the light emitting chip 4 provided on the board 10; and a sealing resin member 11 shaped like a thin rectangular solid, for sealing the light emitting chip 4. The light emitting chip 4, as shown in FIGS. 19 and 20, arrays five square chips in a horizontal-axis X direction. One rectangular chip may be used.

A center O1 of the light emitting chip 4 is positioned at or near reference focal points F, F1 of the reflecting surfaces 2U, 2D, 12U, 12D, and is positioned on reference optical axes Z, Z7 of the reflecting surfaces 2U, 2D, 12U, 12D. In addition, a light emitting face of the light emitting chip 4 (face opposite to opposite to a face opposed to the substrate 10) is oriented to the vertical-axis Y direction. In other words, the light emitting face of the light emitting chip 4 of the upside semiconductor-type light source 5U is oriented upward in the vertical-axis Y direction. On the other hand, the light emitting face of the light emitting chip 4 of the downside semiconductor-type light source 5D is oriented downward in the vertical-axis Y direction. Further, a long side of the light emitting chip 4 is parallel to a horizontal-axis X which is orthogonal to the reference optical axes Z, Z7 and the vertical axis Y. The horizontal axis X passes through the center O1 of the light emitting chip 4 or its vicinity (between the center O1 of the light emitting chip 4 and a long side at the rear side of the light emitting chip 4, and in this example, on the long side at the rear side of the light emitting chip 4), or alternatively, passes through the reference focal points F, F1 or its vicinity of the reflecting surfaces 2U, 2D, 12U, 12D.

The horizontal axis X, the vertical axis Y, and the reference optical axes Z, Z7 constitute an orthogonal coordinate (X-Y-Z orthogonal coordinate system) with the center O1 of the light emitting chip 4 serving as an origin. In the horizontal axis X, in the case of the upside unit 2U, 5U, 12U, the right side corresponds to a positive direction, and the left side corresponds to a negative direction; in the case of the downside units 2D, 5D, 12D, the left side corresponds to a positive direction and the right side corresponds to a negative direction. In the vertical axis Y, in the case of the upside units 2U, 5U, 12U, the upside corresponds to a positive direction; and the downside corresponds to a negative direction; and in the case of the downside units 2D, 5D, 12D, the downside corresponds to a positive direction, and the upside corresponds to a negative direction. In the reference optical axes Z, Z7, in a respective one of the upside units 2U, 5U and the downside units 2D, 5D, the front side corresponds to a positive direction and the rear side corresponds to a negative direction.

The reflecting surfaces 2U, 2D of the fixed reflector 3 and the reflecting surfaces 12U, 12D of the movable reflectors 13U, 13D are made up of a parabola-based free curved face (NURBS-curved face). The reference focal point F of the reflecting surfaces 2U, 2D of the fixed reflector 3 and the reference focal point F1 of the reflecting surfaces 12U, 12D of the movable reflector 13U, 13D are coincident or substantially coincident with each other; and are positioned on the reference optical axes Z, Z7 and between the center O1 of the light emitting chip 4 and a long side at the rear side of the light emitting chip 4. In this example, these points are positioned at the long side at the rear side of the light emitting chip 4. In addition, the reference focal-point distance of the reflecting surfaces 2U, 2D of the fixed reflector 3 is about 10 mm to 18 mm, and is greater than the reference focal-point distance F1 of the reflecting surfaces 12U, 12D of the movable reflectors 13U, 13D.

The reference optical axis Z of the reflecting surfaces 2U, 2D of the fixed reflector 9 and the reference optical axis Z7 of the reflecting surfaces 12U, 12D of the movable reflectors 13U, 13D when they are positioned in the second location, are coincident or substantially coincident with each other. In addition, the optical axis Z are orthogonal to the horizontal axis X; and further, pass through the center O1 of the light emitting chip 4 or its vicinity. The reference optical axis Z7 of the reflecting surfaces 12U, 12D of the movable reflectors 13U, 13D is forward from the center O1 of the light emitting chip 4 or its vicinity and is upward with respect to the reference optical axis Z of the reflecting surfaces 2U, 2D of the fixed reflector 9.

Figure 12:
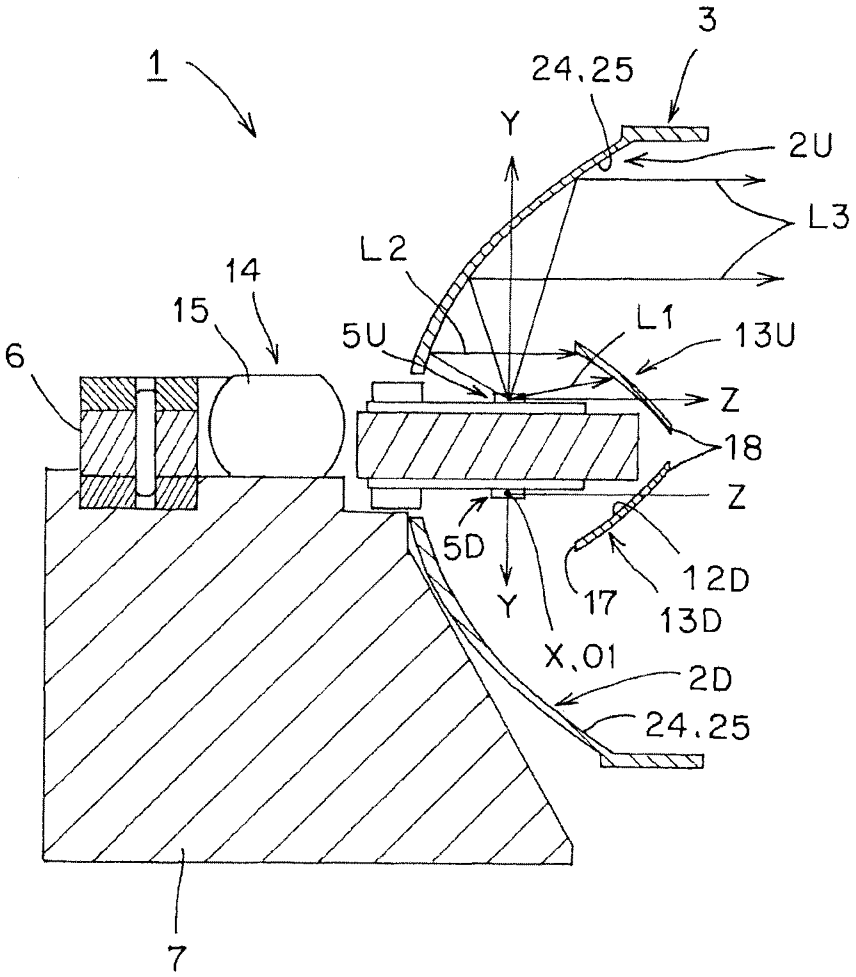
FIG. 12 is a sectional view taken along the line VII-VII in FIG. 10 showing an optical path, similarly.

When the movable reflectors 13U, 13D are positioned in the first location, as shown in FIG. 12, light L1 radiated from the light emitting chip 4 to the first reflecting surface for high beam of the fixed reflector 3 and reflection light L2 reflected on the second reflecting surface for high beam of the fixed reflector 3 are shaded by means of means of the movable reflectors 13U, 13D. As a result, reflection light L3 reflected on the reflecting surface for low beam of the fixed reflector 3 is illuminated toward a forward direction of a vehicle, as the light distribution pattern LP for low beam (light distribution pattern for passing) shown in FIG. 27.

Figure 13:
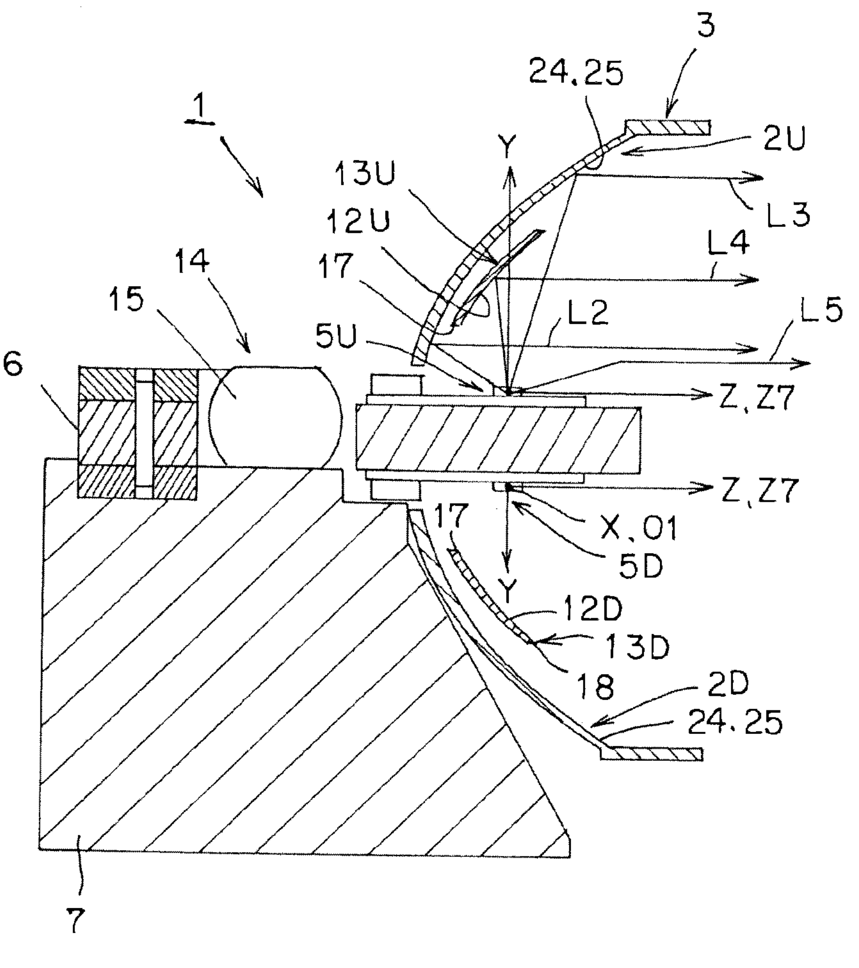
FIG. 13 is a sectional view taken along the line VIII-VIII in FIG. 11 showing an optical path, similarly.
Figure 28:
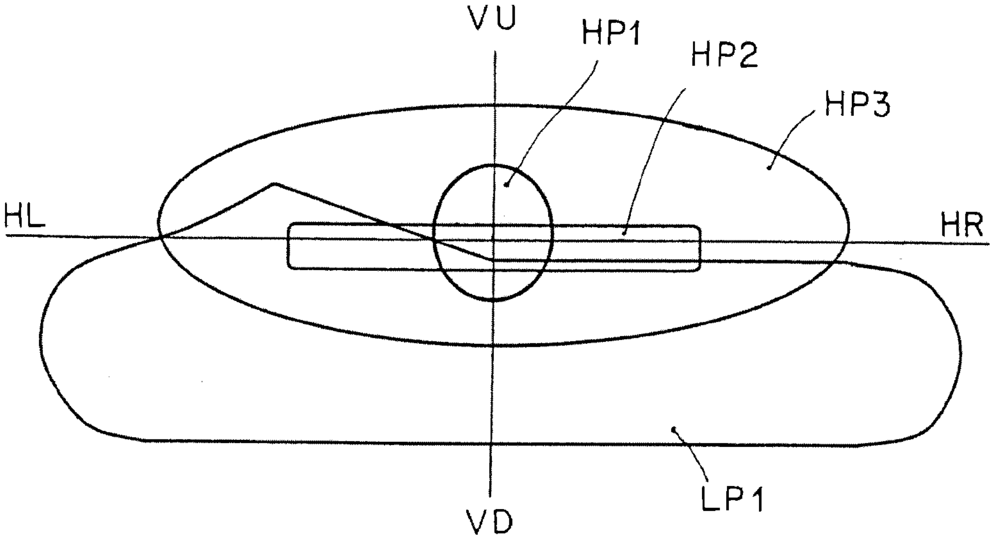
FIG. 28 is an explanatory view showing a light distribution pattern for high beam, similarly.

When the movable reflectors 13U, 13D are positioned in the second location, as shown in FIG. 13, those illuminated toward the forward direction of the vehicle reflection light L4 reflected on the third reflecting surface for high beam (the reflecting surfaces 12U, 12D) are: reflection light L4 reflected on the third reflecting surface of a respective one of the movable reflectors 13U, 13D (the reflecting surfaces 12U, 12D) as the light distribution pattern HP3 for high beam; reflection light beams L5, L2 reflected on the first and second reflecting surfaces for high beam of the fixed reflector 3, shown in FIG. 28 as the first and second light distribution patterns HP1 and HP2 for high beam, shown in FIG. 28; and further, the reflection light L3 reflected on the reflecting surface for low beam of the fixed reflector 3 as the light distribution pattern LP1 for dimming low beam, shown in FIG. 28, respectively. As shown in FIG. 28, a light distribution pattern for high beam (light distribution pattern for cruising) is formed by the first light distribution pattern HP1 for high beam; the second light distribution pattern HP2 for high beam; the light distribution pattern HP3 for high beam; and the light distribution pattern LP1 for dimming low beam, and is illuminated toward the forward direction of the vehicle.

When the movable reflectors 13U, 13D are positioned in the second location, as shown in FIG. 13, a part of the light radiated from the light emitting chip 4 to the reflecting surface for low beam, of the fixed reflector 3, is shaded by means of means of the movable reflectors 13U, 13D, and is reflected as the reflection light L4 on the third reflecting surface for high beam, of the movable reflectors 13U, 13D. In other words, a part of the light from the light emitting chip 4 is changed from the light distribution pattern LP1 for dimming low beam to the third light distribution pattern HP3 for high beam. Thus, the light quantity of the light distribution pattern LP1 for dimming low beam, shown in FIG. 28, is smaller that that of the light distribution pattern LP for low beam, shown in FIG.

Figure 15:
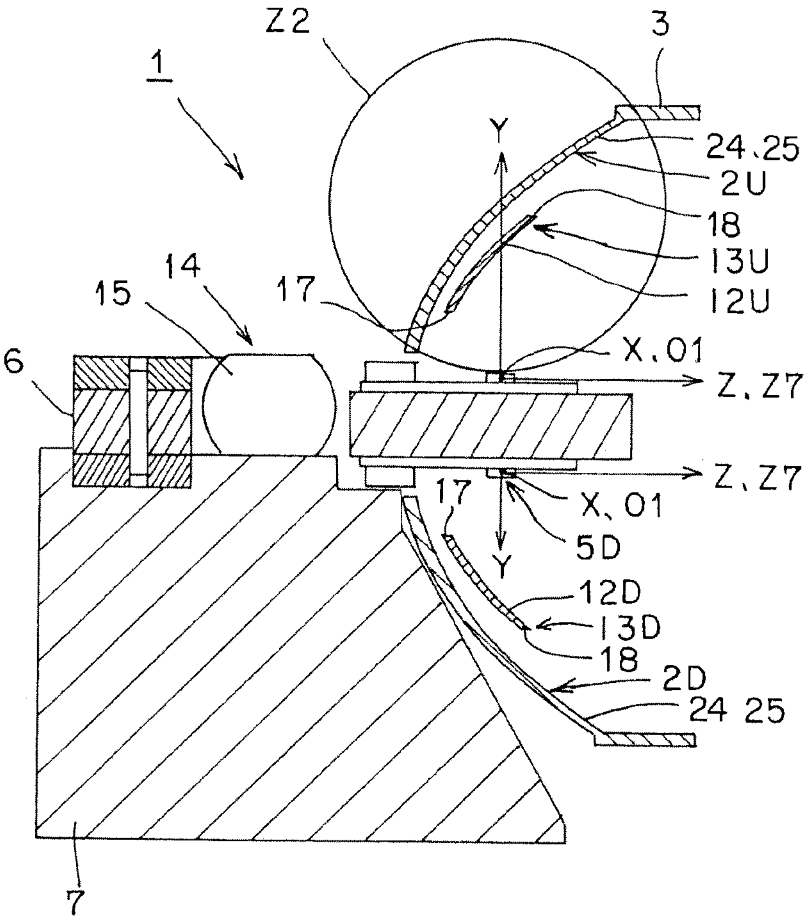
FIG. 15 is a sectional view taken along the line XIII-XIII in FIG. 11 showing an energy distribution of a semiconductor-type light source, similarly.
Figure 18:
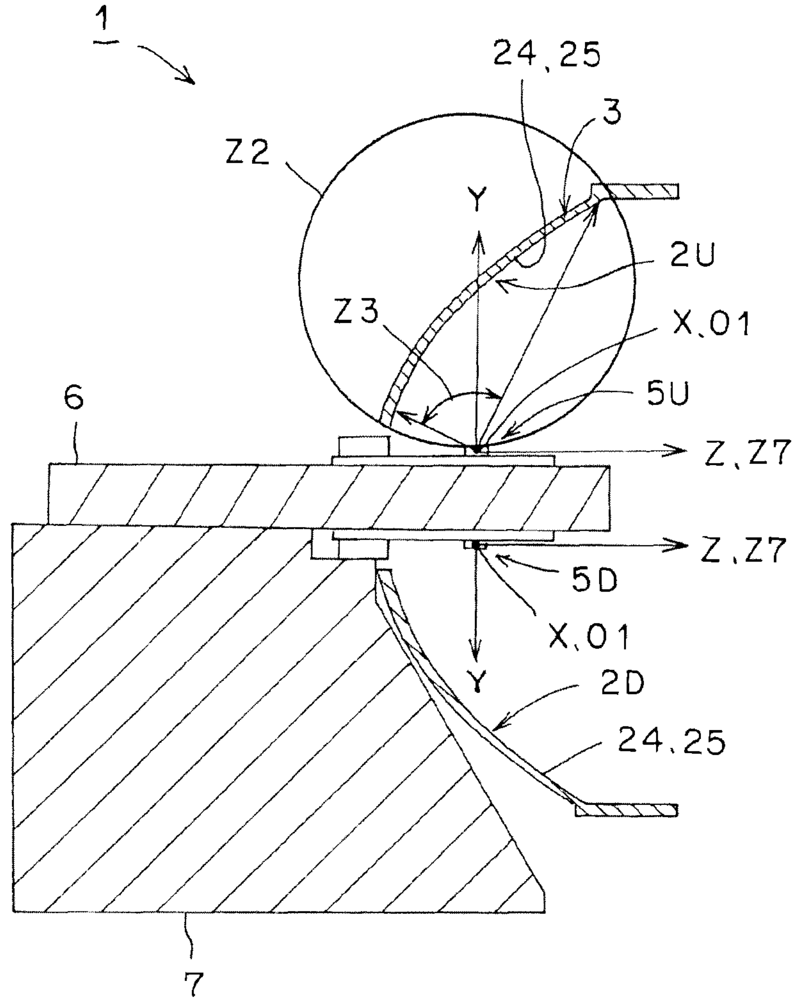
FIG. 18 is a sectional view taken along the line XII-XII in FIG. 17, similarly.

27. On the other hand, when the movable reflectors 13U, 13D are positioned in the first location, the light from the light emitting chip 4, shaded by means of means of the movable reflectors 13U, 13D, is utilized as the first light distribution pattern HP1 for high beam and the second light distribution pattern HP2 for high beam. At this time, as shown in FIGS. 15, and 18, the reflecting surfaces 12U, 12D of the movable reflectors 13U, 13D are positioned in a range Z3 of high energy in an energy distribution Z2 of the light emitting chip 4. As a result, on the whole, the light quantity of a respective one of the light distribution patterns HP1, HP2, HP3, LP1 for high beams (light distribution patterns for cruising), shown in FIG. 28, becomes greater than that of the light distribution pattern LP for low beam (light distribution pattern for passing), shown in FIG. 27.

The reflecting surfaces 2U, 2D are divided into eight sections in the vertical-axis Y direction and the central two are made up of segments 21, 22, 23, 24, 25, 26, 27, 28, 29, 20, divided into two sections, respectively, in the horizontal-axis X direction. The second segment 22, the third segment 23, the fourth segment 24, the fifth segment 25, the sixth segment 26, and the seventh segment 27 at the central part and the peripheral part constitute the reflecting surface for low beam. In addition, the first segment 21 and the eighth segment 28 at both ends constitute the first reflecting surface for high beam. Further, the ninth segment 29 and the tenth segment 20 at the central part constitute the second reflecting surface for high beam.

On the reflecting surface for low beam, the fourth segment 24 of the central part constitutes a first reflecting surface for low beam. In addition, the fifth segment 25 of the central part constitutes a second reflecting surface for low beam. Further, the second segment 22, the third segment 23, the sixth segment 26, and the seventh segment 27 at an end part constitute a third reflecting surface for low beam.

Figure 21:
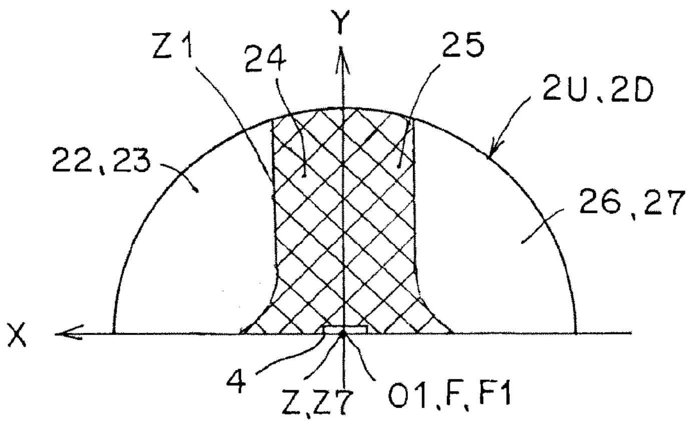
FIG. 21 is an explanatory plan view showing a range in which a first reflection surface made of a fourth segment and a second reflection surface made of a fifth segment are provided, similarly.

The fourth segment 24 of the first reflecting surface for low beam and the fifth segment 25 of the second reflecting surface for low beam, of the central part, are provided in the range Z1 between two longitudinal thick solid lines in FIG. 17, with the range Z1 being a range in which the lattice dashed line in FIG. 21 is drawn, i.e., with the range Z1 being a range in which a longitude angle from the center O1 of the light emitting chip is ±40 degrees (±θ degrees in FIG. 20). The second segment 22, the third segment 23, the sixth segment 26, and the seventh segment 27 of the third reflecting surface for low beam of the end art are provided in a white-ground range in FIG. 21 other than the range Z1, i.e., in a range in which the longitude angle from the center O1 of the light emitting chip is ±40 degrees or more.

Figure 22:
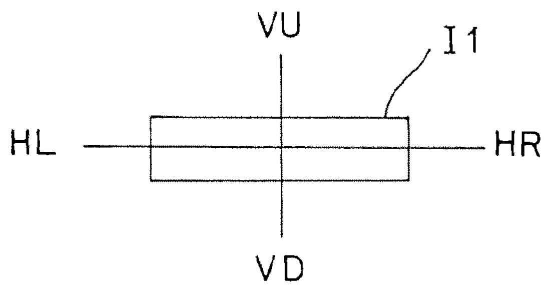
FIG. 22 is an explanatory view showing a reflection image of a light emitting chip, obtained at a point P1 of a reflection surface, similarly.
Figure 23:
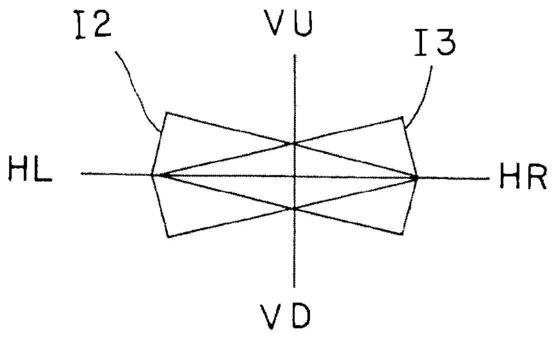
FIG. 23 is an explanatory view showing a reflection image of a light emitting chip, obtained at points P2, P3 of a reflection surface, similarly.
Figure 24:
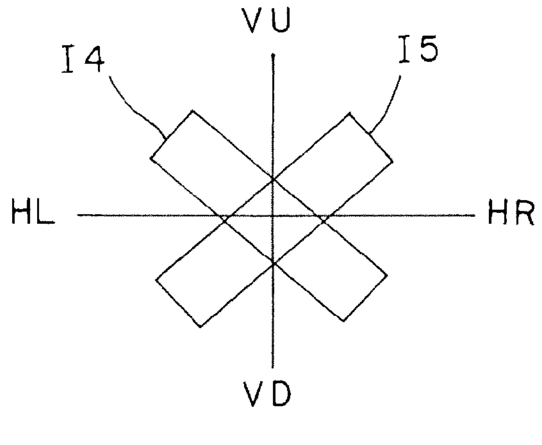
FIG. 24 is an explanatory view showing a reflection image of a light emitting chip, obtained at points P4, P5 of a reflection surface, similarly.

Hereinafter, a reflection image (screen map) of the light emitting chip 4 with a shape of a planar rectangle, obtained in a respective one of segments 22 to 27 of the reflecting surface for low beam among the reflecting surfaces 2U, 2D will be described referring to FIGS. 22, 23, and 24. In other words, at a boundary P1 between the fourth segment 24 and the fifth segment 25, as shown in FIG. 22, a reflection image I1 of the light emitting chip with a tilt angle of about 0 degrees is obtained with respect to a horizontal line HL-HR of a screen. In addition, at a boundary P2 between the third segment 23 and the fourth segment 24, as shown in FIG. 23, a reflection image I2 of the light emitting chip with a tilt angle of about 20 degrees is obtained with respect to the horizontal line HL-HR of the screen. Further, at a boundary P3 between the fifth segment 25 and the sixth segment 26, as shown in FIG. 23, a reflection image I3 of the light emitting chip 4 with a tilt angle of about 20 degrees is obtained with respect to the screen HL-HR of the screen. Furthermore, at a boundary P4 between the second segment 22 and the third segment 23, as shown in FIG. 24, a reflection image I4 of the light emitting chip 4 with a tilt angle of about 40 degrees is obtained with respect to the horizontal line HL-HR of the screen. Still furthermore, at a boundary P5 between the sixth segment 26 and the seventh segment 27, as shown in FIG. 24, a reflection image I5 of the light emitting chip 4 with a tilt angle of about 40 degrees is obtained with respect to the horizontal line HL-HR of the screen.

As a result, in the fourth segment 24 of the reflecting surface for low beam, reflection images from the reflection image I1 with the tilt angle of about 0 degrees shown in FIG. 22 to the reflection image I2 with the tilt angle of about 20 degrees shown in FIG. 23 are obtained. In addition, in the fifth segment 25 of the reflecting surface for low beam, reflection images from the reflection image I1 with the tilt angle of about 0 degrees shown in FIG. 22 to the reflection image I3 with the tilt angle of about 20 degrees shown in FIG. 23 are obtained. Further, in the third segment 23 of the reflecting surface for low beam, reflection images from the reflecting surface I2 with the tilt angle of about 20 degrees shown in FIG. 23 to the reflection image with the tilt angle of about 40 degrees shown in FIG. 24 are obtained. Furthermore, in the sixth segment of the reflecting surface for low beam, reflection images from the reflection images I3 with the tilt angle of about 20 degrees shown in FIG. 23 to the reflection image I5 with the tilt angle of about 40 degrees shown in FIG. 24 are obtained. Still furthermore, in the second segment 22 and the seventh segment 27 of the reflecting surface for low beam, a reflection image with a tilt angle of about 40 degrees or more is obtained.

Here, the reflection images from the reflection image I1 with the tilt angle of about 0 degree shown in FIG. 22 to the reflection images I2, I3 with the tilt angle of about 20 degrees shown in FIG. 23 are reflection images optimal to form a light distribution including an oblique cutoff line CL1 of the light distribution pattern LP for low beam. In other words, this is because it is easy to take the reflection images from the reflection image I1 with the tilt angle of about 0 degrees to the reflection images I2, I3 with the tilt angle of about 20 degrees along the oblique cutoff line CL1 with the tilt angle of about 15 degrees. On the other hand, the reflection images with the tilt angle of about 20 degrees or more, including the reflection images I4, I5 with the tilt angle of about 40 degrees shown in FIG. 24, are reflection images which is not suitable to form a light distribution including the oblique cutoff line CL1 of the light distribution pattern LP for low beam. In other words, this is because, if the reflection image with the tilt angle of about 20 degrees or more is taken along the oblique cutoff line CL1 with the tilt angle of about 15 degrees, a light distribution becomes thick in a vertical direction, resulting in an excessive short-distance light distribution (i.e., light distribution with lowered long-distance visibility).

Figure 14:
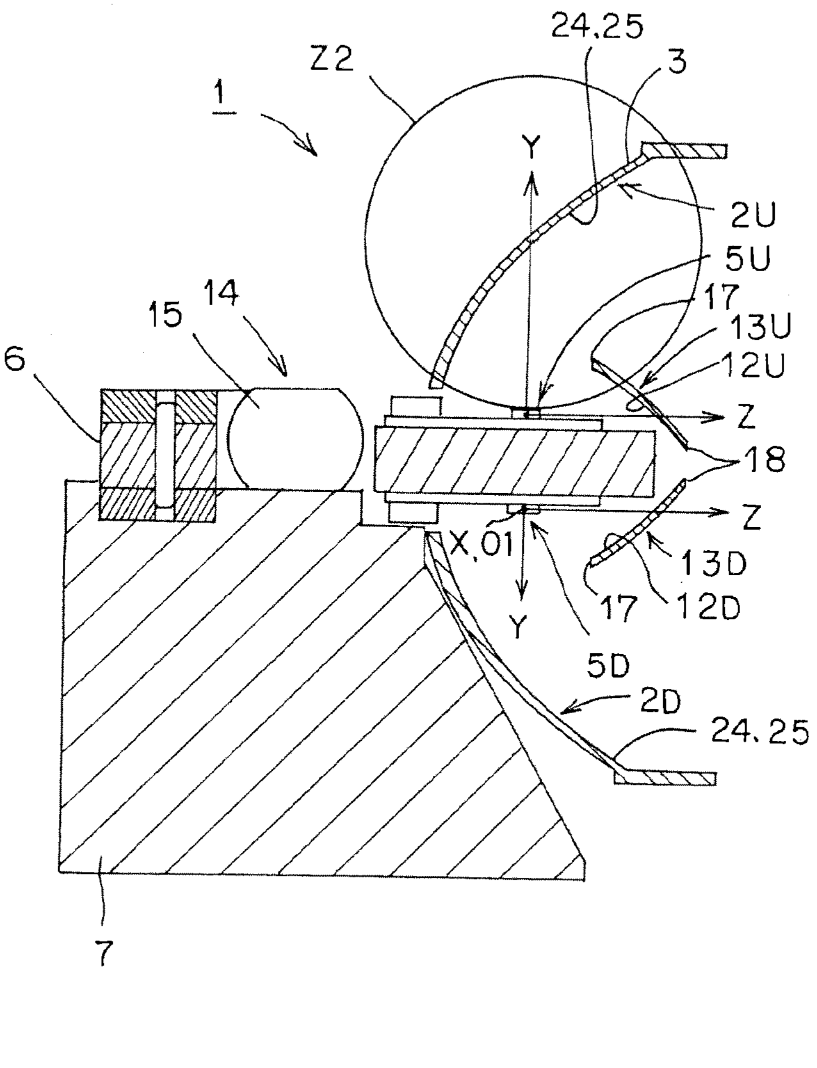
FIG. 14 is a sectional view taken along the line XII-XII in FIG. 10 showing an energy distribution of a semiconductor-type light source, similarly.

In addition, light distribution in the oblique cutoff line CL1 is responsible for a light distribution with long-distance visibility. Thus, there is a need to form a high luminous intensity zone (high energy zone) for light distribution in the oblique cutoff line CL1. Therefore, the fourth segment 24 of the first reflecting surface for low beam and the fifth segment 25 of the second reflecting surface for low beam at the central part, as shown in FIG. 18, are included in a range Z3 of high energy in energy distribution (Lambertian) Z2 of the light emitting chip 4. In FIGS. 14, 15, and 18, the energy distribution of the downside semiconductor-type light source 5D is not shown.

From the foregoing, a reflecting surface optimal to form the light distribution in the oblique cutoff line CL1 is determined depending upon a relative relationship between a range in which the reflection images I1, I2 within the tilt angle of 20 degrees, of a parabola-based, free curved reflecting surfaces, are obtained, and the energy distribution (Lambertian) of the semiconductor-type light sources 5U, 5D. As a result, the reflecting surface optimal to form the light distribution in the oblique cutoff line CL1, i.e., the fourth segment 24 and the fifth segment 25 are provided in the range Z1 in which the longitudinal angle is ±40 degrees from the center O1 of the light emitting chip 4, in which the reflection images I1, I2 within an angle (about 20 degrees) determined by adding about 5 degrees to the tilt angle (about 15 degrees) of the oblique cutoff line CL1 are obtained, and in the high-energy range Z3 in the energy distribution (Lambertian) Z2 of the light emitting chip 4.

The first reflecting surface for low beam made of the fourth segment 24, as shown FIGS. 25 and 27, is a reflecting surface made of a free curved face for light-distributing and controlling the reflection images I1, I3 of the light emitting chip 4 in the range Z4 in the light distribution pattern LP for low beam, so that: the reflection images I1, I2 of the light emitting chip 4 do not run out of the oblique cutoff line CL1 and the horizontal cutoff line CL2; and a part of the reflection images I1, I2 of the light emitting chip 4 is substantially in contact with the oblique cutoff line CL1 and the horizontal cutoff line CL2.

In addition, the second reflecting surface for low beam made of the fifth segment 5, as shown in FIGS. 26 and 27, is a reflecting surface made of light-distributing and controlling the reflection images I1, I3 of the light emitting chip 4 in the range Z5 containing the zone Z4 in the light distribution pattern LP for low beam, so that: the reflection images I1, I3 of the light emitting chip 4 do not run out of the oblique cutoff line CL1 and the horizontal cutoff line CL2 and a part of the reflection images I1, I3 of the light emitting chip 4 is substantially in contact with the oblique cutoff line CL1 and the horizontal cutoff line CL2; and so that: the density of a group of the reflection images I1, I3 of the light emitting chip 4 becomes lower than that of a group of the reflection images I1, I2 of the light emitting chip 4 according to the first reflecting surface for low beam made of the fourth segment 24; and the group of the reflecting surfaces I1, I3 of the light emitting chip 4 contains that of the reflection images I1, I2 of the light emitting chip 4 by the first reflecting surface for low beam made of the fourth segment 24. Further, the densities of the reflection images I1 and I2 of the light emitting chip 4 are identical or substantially identical to those of reflection images I1 ad I3.

Further, the third reflecting surface for low beam made of the second segment 22, the third segment 23, the sixth segment 26, and the seventh segment 27, as shown in FIG. 27, is a reflecting surface made of a free curved face of light-distributing and controlling reflection images I4, I5 of the light emitting chip 4 in a range Z6 containing ranges Z4, Z5 in the light distribution pattern LP for low beam, so that: the reflection images I4, I5 of the light distribution chip 4 are substantially included in the light distribution pattern LP for low beam; the density of a group of the reflection images I4, I5 of the light emitting chip 4 becomes lower than that of a group of the reflection images I1, I2 of the light emitting chip 4 according to the first reflecting surface for low beam made of the fourth segment 24 and a group of the reflection images I1, I3 of the light emitting chip 4 according to the second reflecting surface for low beam made of the fifth segment 25; and the group of the reflection surfaces I4, I5 of the light emitting chip 4 contains that of the reflection images I1, I3 of the light emitting chip 4 according to the second reflecting surface for low beam made of the fifth segment 25.

Figure 3:
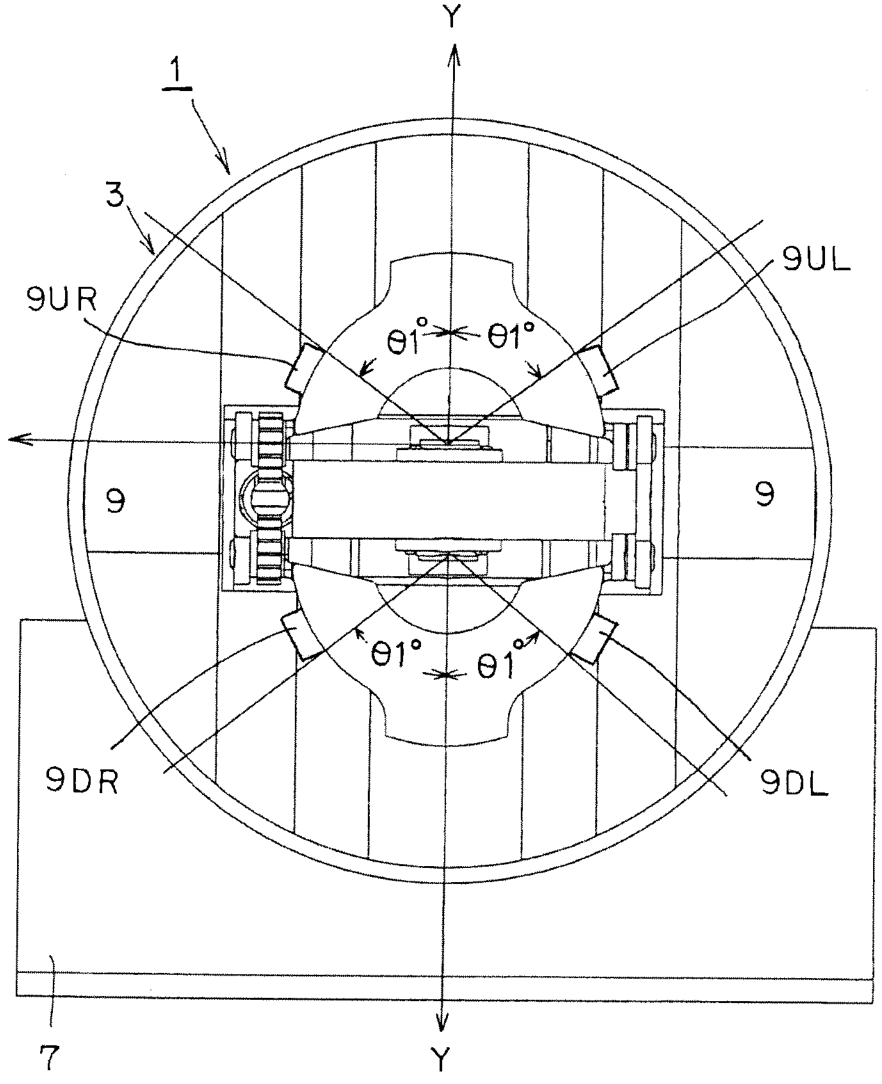
FIG. 3 is an explanatory front view showing a range in which the additional reflection surface is positioned when the upside movable reflector and the downside movable reflector are positioned in the second location, similarly.
Figure 4:
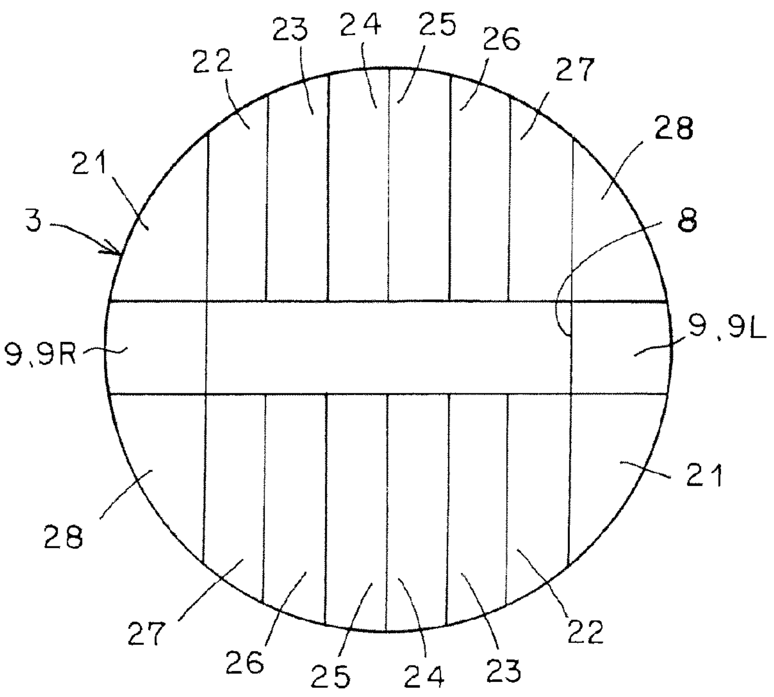
FIG. 4 is an explanatory front view showing an upside reflection surface, a downside reflector surface, and the intermediate invalid reflection surface, similarly.

On the movable reflectors 13U, 13D, additional reflection surfaces 9UL, 9UR, 9DL, 9DR are provided for reflecting, on the intermediate invalid reflection surface 9, a part L6 of the light beams that are radiated from the light emitting chips 4 of the semiconductor-type light source 5U, 5D. The additional reflection surfaces 9UL, 9UR, 9DL, 9DR are positioned in a range other than a high energy range Z3 in energy distribution Z2 of the light emitting chips 4 of the semiconductor-type light sources 5U, 5D of the movable reflectors 13U, 13D when they are positioned in the second location. In other words, the additional reflection surfaces 9UL, 9UR, 9DL, 9DR, as shown in FIG. 3, are provided by means of reflection surface processing on an interior face of a protrusive portion that is formed in the shape of a small square, which is provided at a site inclined at an angle of θ1 degree (about 60 degrees in this example) from a Y axis from among outer circumferential edge parts of the movable reflectors 13U, 13D when they are positioned in the second location that is viewed from a front side.

Figure 1:
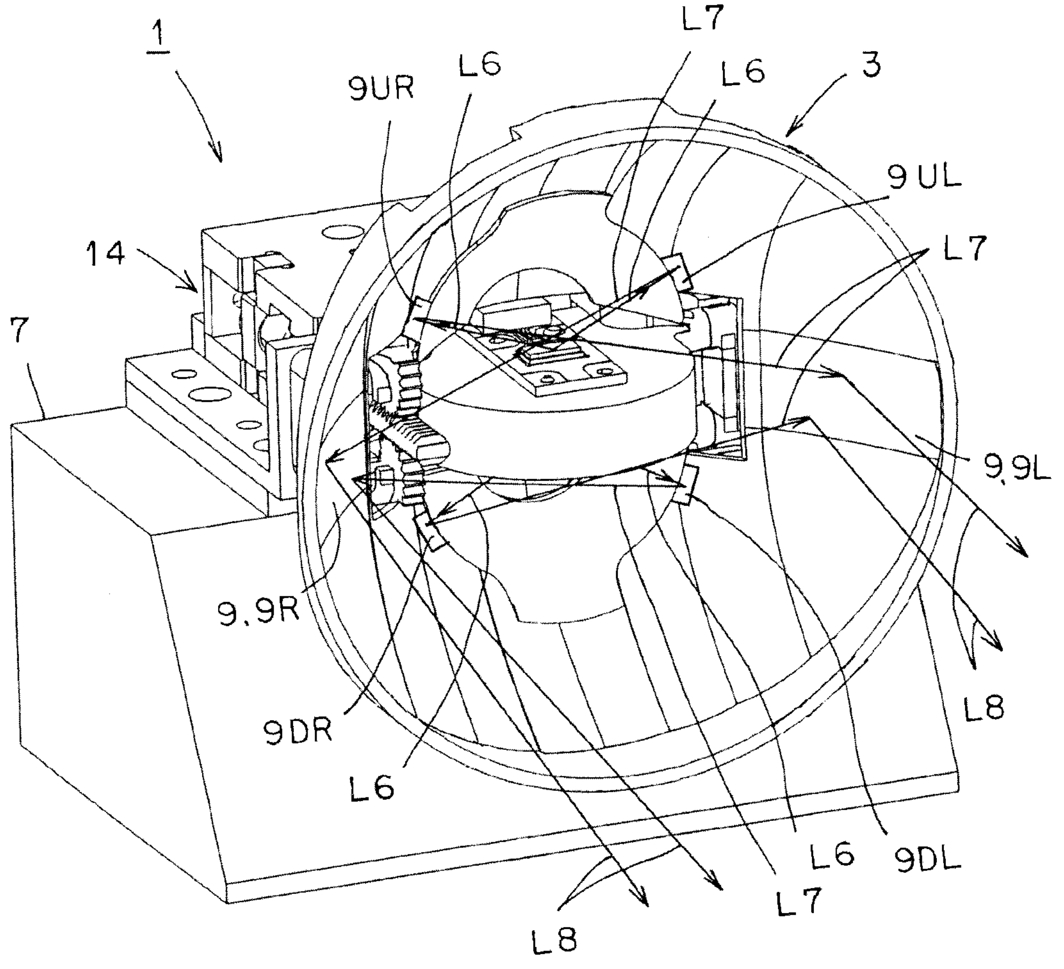
FIG. 1 shows a first embodiment of a vehicle lighting device according to the present invention, and is an explanatory perspective view of an optical path in an additional reflection surface and an intermediate invalid reflection surface when an upside movable reflector and a downside movable reflector are positioned in a second location.
Figure 2:
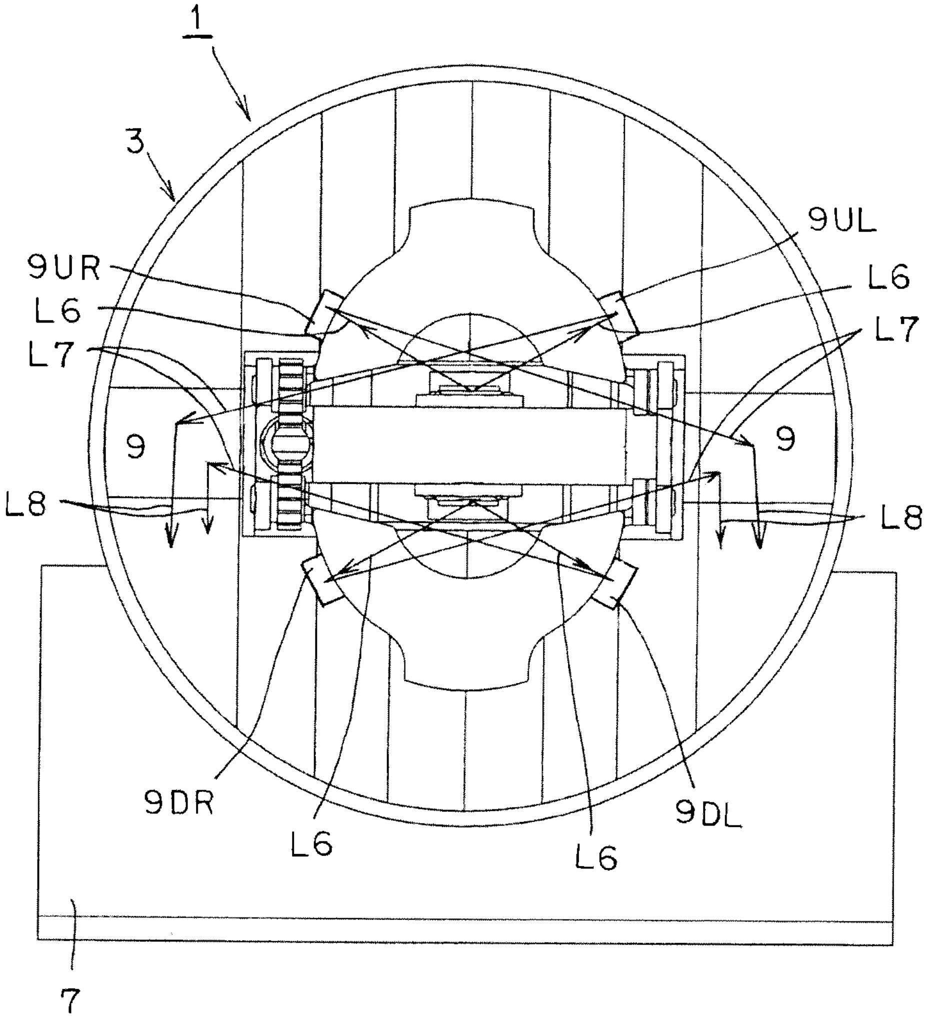
FIG. 2 is an explanatory front view showing an optical path in the additional reflection surface and the intermediate invalid reflection surface when the upside movable reflector and the downside movable reflector are positioned in the second location, similarly.

The additional reflection surfaces 9UL, 9UR, 9DL, 9DR, as shown in FIG. 1 and FIG. 2, are the ones for reflecting, on the intermediate invalid reflection surface 9, a part L6 of the light beams that are radiated from the light emitting chips 4 of the semiconductor-type light sources 5U, 5D, by means of cross reflection. In other words, the additional reflection surfaces 9UL, 9DL at the left side, as shown in FIG. 1 and FIG. 2, are the ones for reflecting, on the intermediate invalid reflection surfaces 9, 9R at the right side, a part L6 of the light beams that are radiated from the light emitting chips 4 of the semiconductor-type light sources 5U, 5D, by means of cross reflection, whereas the additional reflection surfaces 9UR, 9DR at the right side, as shown in FIG. 1 and FIG. 2, are the ones for reflecting, on the intermediate invalid reflection surfaces 9, 9L at the left side, a part L6 of the light beams that are radiated from the light emitting chips 4 of the semiconductor-type light sources 5U, 5D, by means of cross reflection.

(Functions of the Constituent Elements)

The vehicle lighting device 1 of the embodiment is made of the constituent elements as described above, and hereinafter, functions of the constituent elements will be described.

First, an upside movable reflector 13U and a downside movable reflector 13D are positioned in a first position (the location in a state shown in FIGS. 8, 10, 12, and 14). In other words, if power distribution to the motor 15 of the drive unit 14 is interrupted, the upside movable reflector 13U and the downside movable reflector 13D are positioned in the first location due to a spring action and a stopper action which is not shown. At this time, a light emitting chip 4 of a respective one of the upside semiconductor-type light source 5U and the downside semiconductor-type light source 5D is lit to emit light. Afterward, light is radiated from the light emitting chip of the upside semiconductor-type light source 5U and the downside semiconductor-type light source 5D.

A part of the light, i.e., light L1 radiated onto the first reflecting surface for high beam (the first segment 21 and the eighth segment 28) of a fixed reflector 3, as shown in FIG. 12, is shaded by means of means of the upside movable reflector 13U and the downside movable reflector 13D. In addition, a part of the light, i.e., reflection light L2 reflected on the second reflecting surface for high beam (the ninth segment 29 and the tenth segment 20) of the fixed reflector 3, as shown in FIG. 12, is shaded by means of means of the upside movable reflector 13U and the downside movable reflector 13D. Further, the remaining light L3, as shown in FIG. 12, is reflected on the reflecting surface for low beam (the second segment 22, the third segment 23, the fourth segment 24, the fifth segment 25, the sixth segment 26, the seventh segment 27) of the upside reflecting surface 2U and the downside reflecting surface 2D of the fixed reflector 3, as shown in FIG. 12. The reflection light L3 is illuminated toward a forward direction of a vehicle, as a light distribution pattern LP for low beam, shown in FIG. 27. Direct light (not shown) from the light emitting chip 4 of the upside semiconductor-type light source 5U and the downside semiconductor-type light source 5D is shaded by means of means of the upside movable reflector 13U and the downside reflector 13D, in particular by means of a visor portion 18. In FIG. 12, the optical paths in the downside reflecting surface 2D of the fixed reflector 3 and the downside reflecting surface 12D of the downside movable reflector 13D are not shown.

In other words, reflection light from the first reflecting surface for low beam made of the fourth segment 24 of the reflecting surfaces 2U, 2D is light-distributed and controlled in the range Z4 in the light distribution pattern LP for low beam so that: the reflection images I1, I2 of the light emitting chip 4 does not run out of the oblique cutoff line CL1 and the horizontal cutoff line CL2; and a part of a respective one of the reflection images I1, I2 of the light emitting chip 4 is substantially in contact with the oblique cutoff line CL1 and the horizontal cutoff line CL2.

In addition, reflection light from the second reflecting surface for low beam made of the fifth segment 25 of the reflecting surfaces 2U, 2D is light-distributed and controlled in a range Z5 containing a range Z4 in the light distribution pattern LP for low beam, so that: the reflection images I1, I3 of the light emitting chip 4 do not run out of the oblique cutoff line CL1 and the horizontal cutoff line CL2 and a part of a respective one of the reflection images I1, I3 of the light emitting chip 4 is substantially in contact with the oblique cutoff line CL1 and the horizontal cutoff line CL2; and so that density of the group of the reflection images I1, I3 of the light emitting chip 4 becomes lower than that of the group of the reflection images I1, I2 of the light emitting chip 4 according to the first reflecting surface for low beam made of the fourth segment 24 and the group of the reflection images I1, I2 of the light emitting chip 4 contains that of the reflection images I1, I2 of the light emitting chip 4 according to the first reflecting surface for low beam made of the fourth segment 24.

Further, the reflection light from the third reflecting surface for low beam made of the second segment 22, the third segment 23, the sixth segment 26, and the seventh segment 27 of the reflecting surfaces 2U, 2D is light-distributed and controlled in the range Z6 containing the ranges Z4, Z5 in the light distribution pattern LP for low beam, so that: the reflection images I4, I5 of the light emitting chip 4 are substantially included in the light distribution pattern LP for low beam; the density of the group of the reflection images I4, I5 of the light emitting chip 4 becomes lower than that of the group of the reflection images I1, I2 of the light emitting chip 4 according to the first reflecting surface for low beam made of the fourth segment 24 and that of the group of the reflection images I1, I3 of the light emitting chip 4 according to the second reflecting surface for low beam made of the fifth segment 25; and the group of the reflection images I4, I5 of the light emitting chip 4 contains that of the reflection images I1, I2 of the light emitting chip 4 according to the first reflecting surface for low beam made of the fourth segment 24 and that of the reflection image I1, I3 of the light emitting chip 4 according to the second reflecting surface for low beam made of the fifth segment 25.

Figure 5:
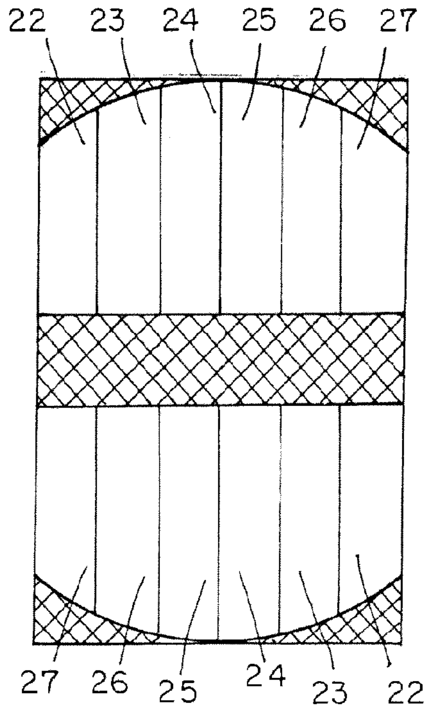
FIG. 5 is an explanatory front view showing a range in which the upside reflection surface and the downside reflection surface are illuminated when the upside movable reflector and the downside movable reflector are positioned in a first location and then a light distribution pattern for low beam is reflected and emitted, similarly.

As described above, a light distribution pattern LP for low beam, shown in FIG. 27, is emitted forward of a vehicle. At this time, when this vehicle lighting device 1 in the first embodiment is seen from a substantial front side, as shown in FIG. 5, reflection surfaces for low beam (a second segment 22, a third segment 23, a fourth segment 24, a fifth segment 25, a sixth segment 26, a seventh segment 27) of the upside reflection surface 2U and the downside reflection surface 2D of the fixed reflector 3 can be seen to be luminous. On the other hand, in a square surrounding these portions seen to be luminous (the second segment 22, the third segment 23, the fourth segment 24, the fifth segment 25, the sixth segment 26, the seventh segment 27), four corner parts outside of the portions seen to be luminous (the outline portions in FIG. 5) and a part of the window portion 8 are seen as dark parts (the parts to which the grating pattern in FIG. 5 is applied).

In addition, an area of these portions seen to be luminous is about 60% or more relative to that of the square surrounding the portion seen to be luminous, which is larger than that of the dark parts. Therefore, according to the vehicle lighting device 1 in the first embodiment, when the light distribution pattern LP for low beam, shown in FIG. 27, is emitted forward of the vehicle, the entire lighting device is seen luminous; and therefore, even if the portions seen to be luminous are divided into top and bottom by means of the dark parts of the window portion 8, there is no problem in quality, visual recognition property, and appearance of the lighting device.

Next, the upside movable reflector 13U and the downside movable reflector 13D are positioned in a second location (the location in a state shown in FIGS. 1 to 3, 9, 11, 13, and 15). In other words, if a motor 15 is driven by supplying power to a motor 15 of a drive unit 14, a drive force of the motor 15 is transmitted to the upside movable reflector 13U and the downside movable reflector 13D via a drive force transmission mechanism 16; the upside movable reflector 13U and the downside movable reflector 13D rotate in synchronism from the first location to the second location against a spring force, and are positioned in the second location by means of a stopper action, although not shown. Afterwards, light is radiated from the light emitting chip 4 of the upside semiconductor-type light source 5U and the downside semiconductor-type light source 5D.

A part of the light radiated onto the reflecting surface for low beam (the second segment 22, the third segment 23, the fourth segment 24, the fifth segment 25, the sixth segment 26, the seventh segment 27) of the upside reflecting surface 2U and the downside reflecting surface 2D of the fixed reflector 3, as shown in FIG. 13, is reflected on the third reflecting surface for high beam (reflecting surfaces 12U, 12D) of the movable reflector 13U, 13D, and the reflection light L4 is illuminated toward the forward direction of the vehicle, as the third light distribution pattern HP3 for high beam, shown in FIG. 28. In addition, the light radiated onto the reflecting surface for low beam (the second segment 22, the third segment 23, the fourth segment 24, the fifth segment 25, the sixth segment 26, the seventh segment 27) of the upside reflecting surface 2U and the downside reflecting surface 2D of the fixed reflector 3, and the remaining light having not been incident to the third reflecting surface (reflecting surfaces 12U, 12D) of the movable reflectors 13U, 13D, as shown in FIG. 13, are reflected on the reflecting surface for low beam (the second segment 22, the third segment 23, the fourth segment 24, the fifth segment 25, the sixth segment 26, the seventh segment 27) of the fixed reflector 3; and the reflection light L3 is illuminated toward the forward direction of the vehicle, as the light distribution pattern LP1 for dimming low beam, shown in FIG. 28. Further, when the upside movable reflector 13U and downside movable reflector 13D are positioned in the first location, light L1 radiated onto the first reflecting surface for high beam (the first segment 21 and the eighth segment 28) of the fixed reflector 3, shaded by means of the upside movable reflector 13U and the downside movable reflector 13D, as shown in FIG. 13, is reflected on the first reflecting surface for high beam (the first segment 21 and the eighth segment 28) of the fixed reflector 3, and the reflection light L5 is illuminated toward the forward direction of the vehicle, as the light distribution pattern HP1 for high beam, shown in FIG. 28. Furthermore, when the upside movable reflector 13U and the downside movable reflector 13D are positioned in the first location, reflection light L2 from the second reflecting surface for high beam (the ninth segment 29 and the tenth segment 20) of the fixed reflector 3, shaded by means of the upside movable reflector 13U and the downside movable reflector 13D, as shown in FIG. 13, passes through a through hole 17 of the upside movable reflector 13U and the downside movable reflector 13D positioned in the second location; and is illuminated toward the forward direction of the vehicle, as the second light distribution pattern HP2 for high beam, shown in FIG. 28. In FIG. 13, the optical paths in the downside reflecting surface 2D of the fixed reflector 3 and the downside reflecting surface 12D of the downside movable reflector 13D are not shown.

In addition, a part L6 of the light beams that are radiated from the light emitting chips 4 of the upside semiconductor-type light source 5U and the downside semiconductor-type light source 5D is incident to the additional reflection surfaces 9UL, 9UR, 9DL, 9DR and then the incident light is cross-reflected on the intermediate invalid reflection surfaces 9, 9L, 9R by means of the additional reflection surfaces 9UL, 9UR, 9DL, 9DR. In other words, reflection light L7 cross-reflected on the additional reflection surfaces 9UL, 9DL at the left side, as shown in FIG. 1 and FIG. 2, is incident to the intermediate invalid reflection surfaces 9, 9R at the right side, whereas the reflection light L7 cross-reflected on the additional reflection surfaces 9UR, 9DR at the right side, as shown in FIG. 1 and FIG. 2, is incident to the intermediate invalid reflection surfaces 9, 9L at the left side. The light L7 incident to the intermediate invalid reflection surfaces 9, 9L, 9R is emitted as reflection light L8 forward of the vehicle.

Figure 7:
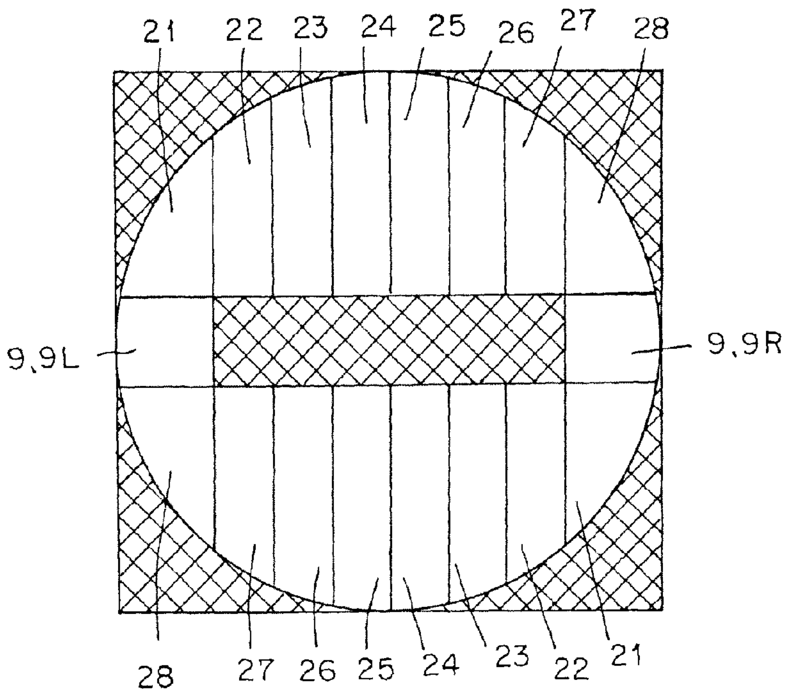
FIG. 7 is an explanatory front view showing a range in which the upside reflection surface, the downside reflection surface, and the intermediate invalid reflection surface are illuminated when the upside movable reflector and the downside movable reflector are positioned in the second location and then the light distribution pattern for high beam is reflected and emitted, similarly.
Figure 8:
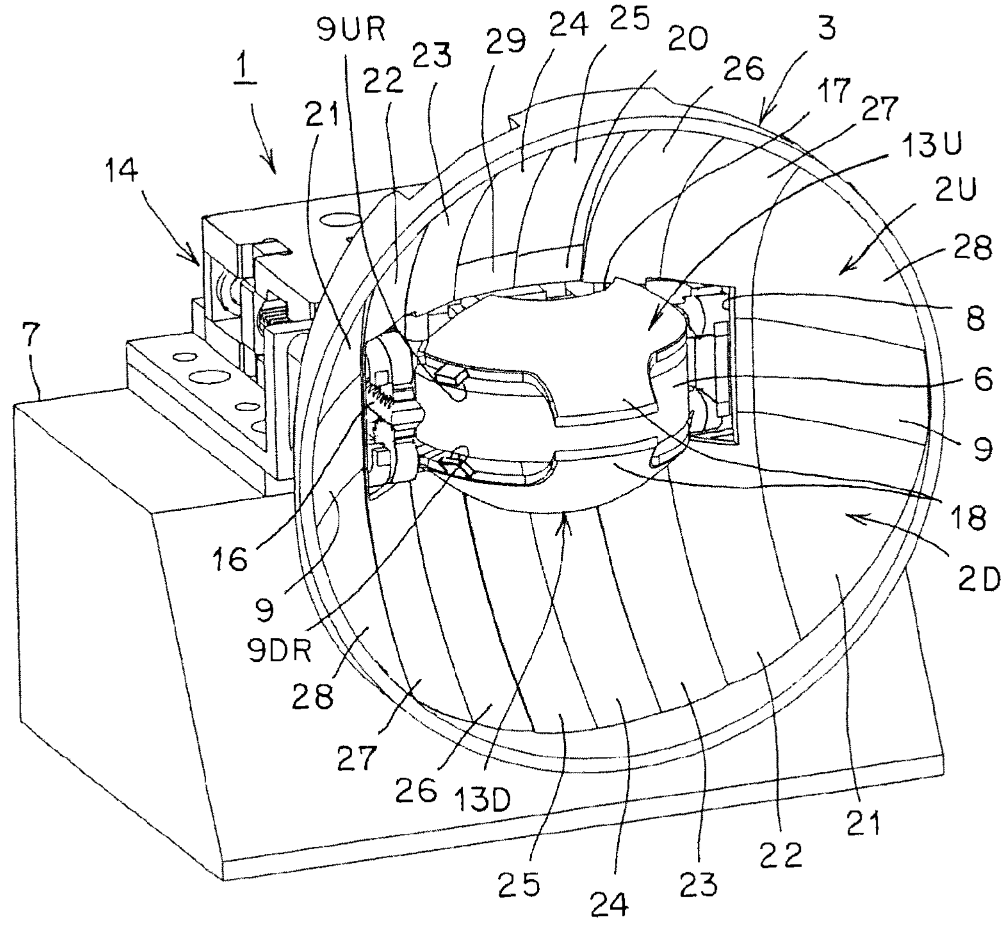
FIG. 8 is a perspective view of essential parts when the upside movable reflector and the downside movable reflector are positioned in the first location, similarly.
Figure 9:
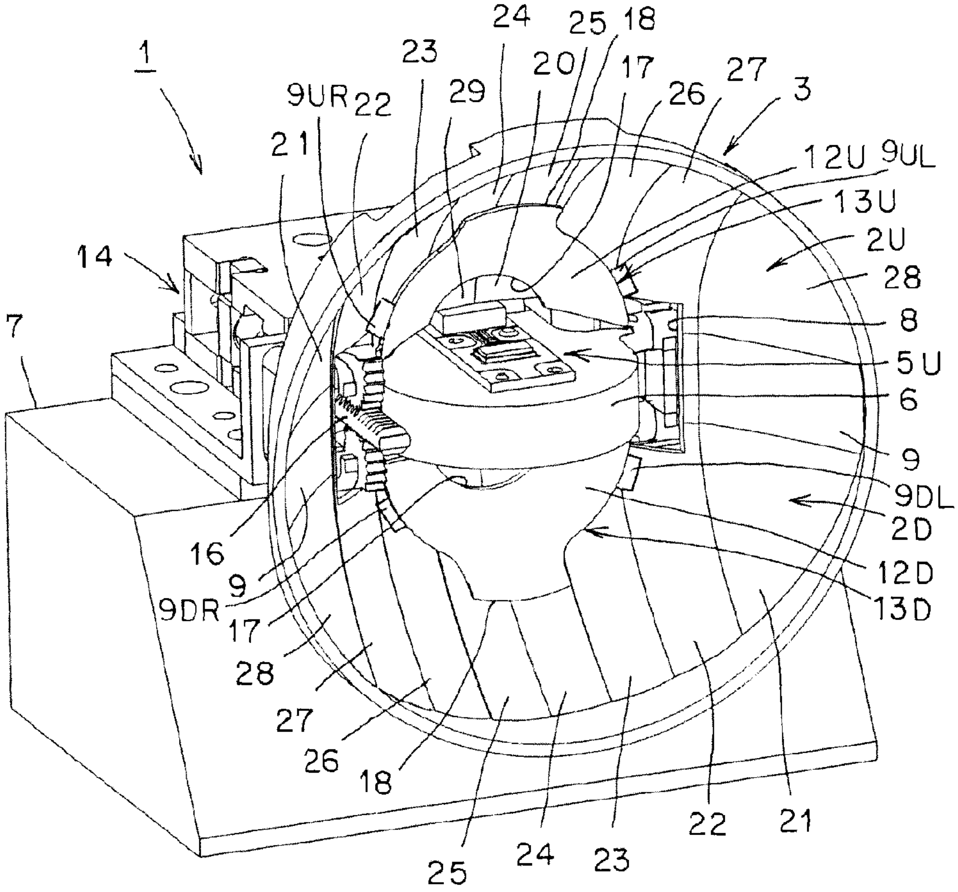
FIG. 9 is a perspective view of essential parts when the upside movable reflector and the downside movable reflector are positioned in the second location, similarly.
Figure 10:
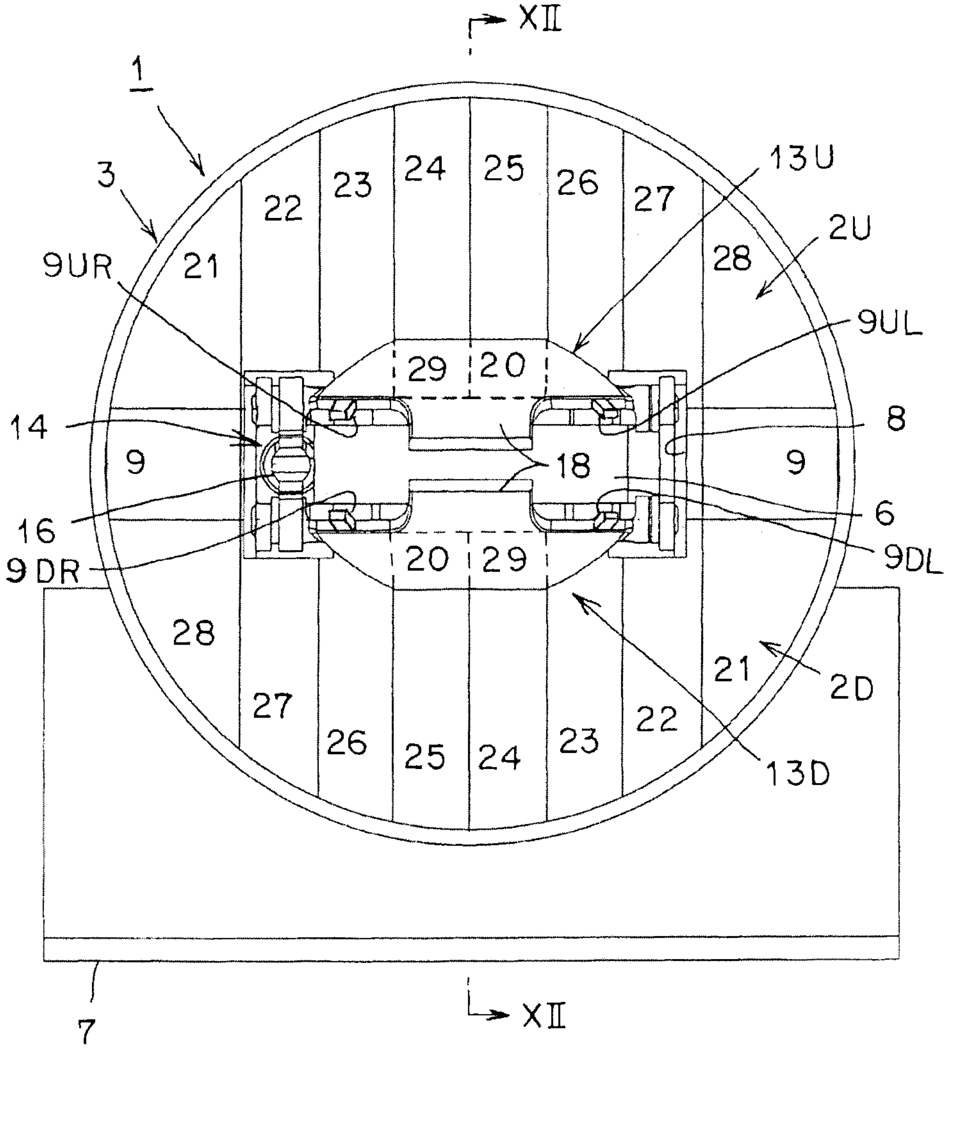
FIG. 10 is a perspective view of essential parts when the upside movable reflector and the downside movable reflector are positioned in the first location, similarly.
Figure 11:
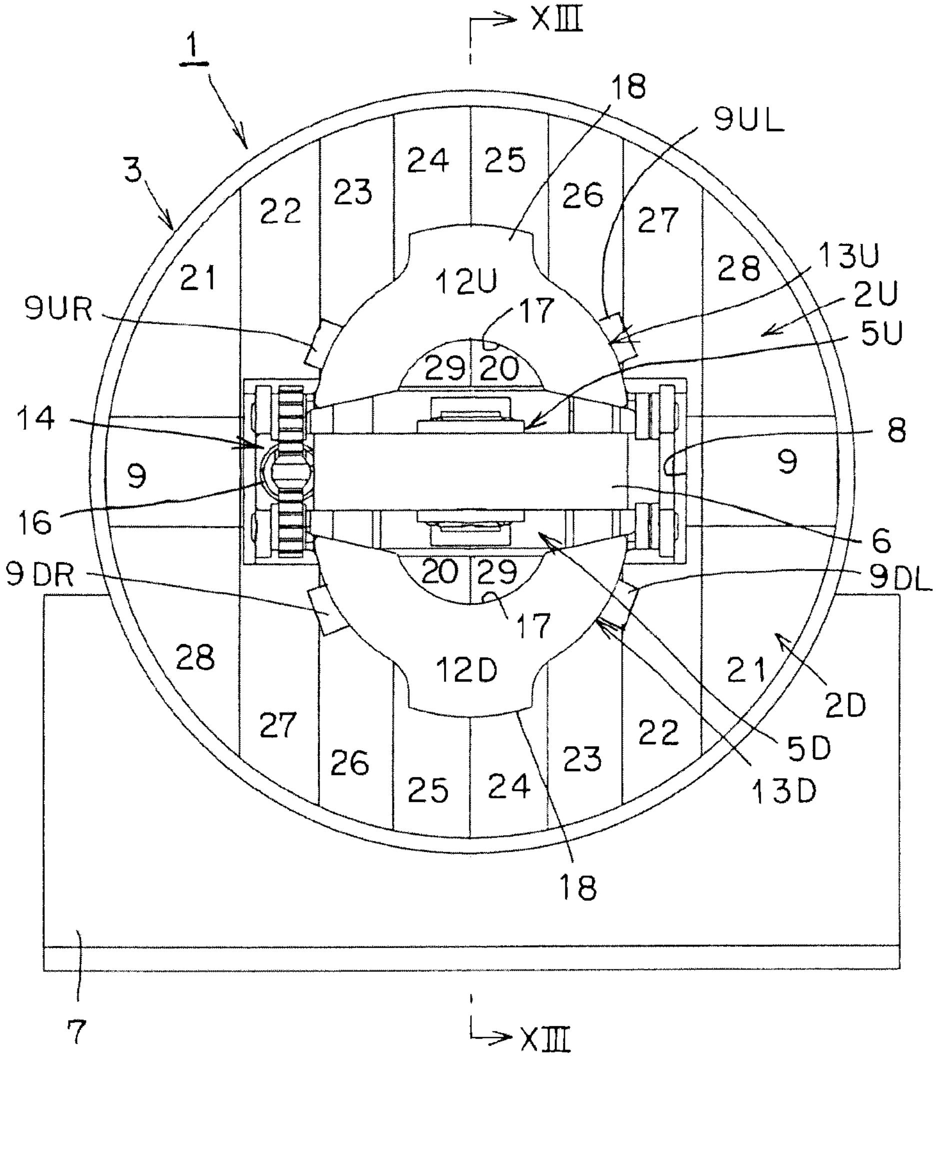
FIG. 11 is a perspective view of essential parts when the upside movable reflector and the downside movable reflector are positioned in the second location, similarly.

In the manner as described above, light distribution pattern HP1, HP2, HP3, LP1 for high beam, shown in FIG. 28, are emitted forward of the vehicle. At this time, when the vehicle lighting device 1 in the first embodiment is seen from a substantial front side, as shown in FIG. 7, the first segment 21, the second segment 22, the third segment 23, the fourth segment 24, the fifth segment 25, the sixth segment 26, the seventh segment 27, and the eighth segment 28 of the upside reflection surface 2U and the downside reflection surface 2D of the fixed reflector 3 are seen to be luminous. With respect to a part of the third segment 23, the fourth segment 24, the fifth segment 25, and the sixth segment 26, the reflection surfaces 12U, 12D of the movable reflectors 13U, 13D are seen to be luminous. In addition, the intermediate invalid reflection surfaces 9, 9L, 9R are also seen to be luminous by means of the reflection light L8. On the other hand, in a square surrounding these portions seen to be luminous (the first segment 21, the second segment 22, the third segment 23, the fourth segment 24, the fifth segment 25, the sixth segment 26, the seventh segment 27, the eighth segment 28, and the intermediate invalid reflection surfaces 9, 9L, 9R), four corner parts outside of these portions seen to be luminous (the outline portions in FIG. 7) and a part of the window portion 8 are seen as dark parts (the parts to which the grating pattern in FIG. 7 is applied).

In addition, an area of the portions seen to be luminous is about 60% or more relative to that of a square surrounding the portions seen to be luminous, and is larger than that of the dark parts. Moreover, the portions seen to be luminous are vertically continuous at both of the left and right sides excluding the dark parts of the window portion 8 of a central portion, by means of the portions seen to be luminous, of the intermediate invalid reflection surfaces 9, 9L, 9R that are positioned at the left and right of the dark part of the window portion 8. Thus, according to the vehicle lighting device 1 in the first embodiment, when the light distribution patterns HP1, HP2, HP3, LP1 for high beam, shown in FIG. 28, are emitted forward of the vehicle, the entire lighting device is seen to be substantially luminous; and therefore, there is no problem in quality, visual recognition property, and appearance of the lighting device.

Figure 6:
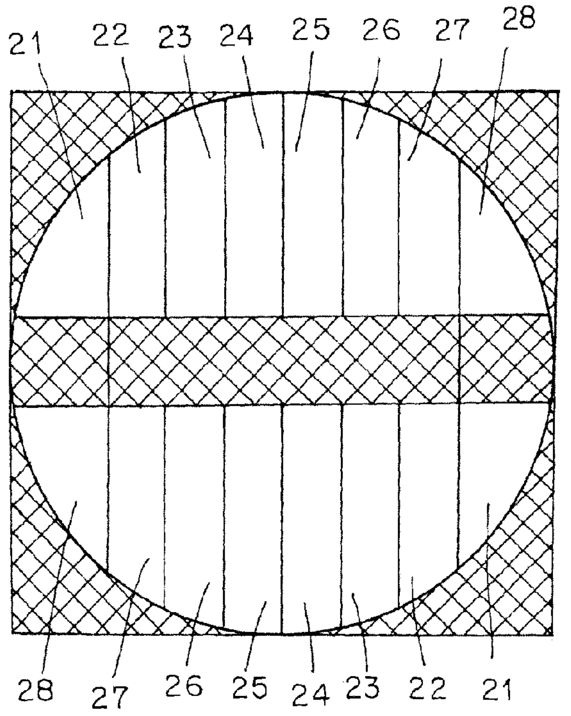
FIG. 6 is an explanatory front view showing a range in which, in a case where no additional reflection surface exists, the upside reflection surface and the downside reflection surface are illuminated when the upside movable reflector and the downside movable reflector are positioned in the second location and then a light distribution pattern for high beam is reflected and emitted, similarly.

Now, with reference to FIG. 6, a description will be given with respect to a vehicle lighting device in which the additional reflection surfaces 9UL, 9UR, 9DL, 9DR are not provided and a part L6 of the light beams that are radiated from the light emitting chips 4 of the upside semiconductor-type light source 5U and the downside semiconductor-type light source 5D is disallowed to be reflected on the intermediate invalid reflection surfaces 9, 9L, 9R. In the case of this vehicle lighting device, as shown in FIG. 6, since light is disallowed to be incident to the intermediate invalid reflection surfaces 9, 9L, 9R, the intermediate invalid reflection surfaces 9, 9L, 9R are seen as dark parts (the parts to which the grating pattern in FIG. 6 is applied). In other words, the portions seen to be luminous correspond to the portions of the first segment 21, the second segment 22, the third segment 23, the fourth segment 24, the fifth segment 25, the sixth segment 26, the seventh segment 27, and the eighth segment 28. In a square surrounding these portions seen to be luminous (the first segment 21, the second segment 22, the third segment 23, the fourth segment 24, the fifth segment 25, the sixth segment 26, the seventh segment 27, and the eighth segment 28), the four corner parts outside of the portions seen to be luminous (the outline portions in FIG. 6), a part of the window portion 8, and portions of the intermediate invalid reflection surfaces 9, 9L, 9R are seen to be dark parts (the parts to which the grating pattern in FIG. 6 is applied).

In addition, an area of the portions seen to be luminous is about 60% or less relative to that of a square surrounding the portions seen to be luminous, and is not so different from that of the dark parts. Moreover, the portions seen to be luminous are divided into a top and a bottom at a dark part of the window portion 8 at a central part and dark parts of the intermediate invalid reflection surfaces 9, 9L, 9R by means of the dark part of the window portion 8 and dark parts of the intermediate invalid reflection surfaces 9, 9L, 9R that are positioned at the left and right of the dark part of the window portion 8. Therefore, in the case of this vehicle lighting device, there is a problem in quality, visual recognition property, and appearance of the lighting device due to the aforementioned dark parts.

On the other hand, according to the vehicle lighting device 1 in the first embodiment, a part L6 of the light beams that are radiated from the light emitting chips 4 of the upside semiconductor-type light source 5U and the downside semiconductor-type light source 5D is cross-reflected on the intermediate invalid reflection surfaces 9, 9L, 9R by means of the additional reflection surfaces 9UL, 9UR, 9DL, 9DR, so that the intermediate invalid reflection surfaces 9, 9L, 9R are seen to be luminous. As a result, according to the vehicle lighting device 1 in the first embodiment, as described previously, when the light distribution patterns HP1, HP2, HP3, LP1 for high beam, shown in FIG. 28, are emitted forward of the vehicle, the entire lighting device is seen to be substantially luminous; and therefore, there is no problem in quality, visual recognition property, and appearance of the lighting device.

(Advantageous Effect)

The vehicle lighting device 1 of the embodiment is made of the constituent elements and functions, as described above, and hereinafter, advantageous effect(s) thereof will be described.

According to the vehicle lighting device 1 in the first embodiment, when the movable reflectors 13U, 13D are positioned in the second location, a part L6 of the light beams that are radiated from the semiconductor-type light sources 5U, 5D is reflected on the additional reflection surfaces 9UL, 9UR, 9DL, 9DR and then the reflected light L7 is incident to the intermediate invalid reflection surfaces 9, 9L, 9R, so that there is allowed to be luminous the intermediate invalid reflection surfaces 9, 9L, 9R between: the fixed reflection surface for second light distribution pattern, which are more outside than the fixed reflection surface for first light distribution pattern of the first fixed reflection surface (the first segment 21 and the eighth segment 28 that are more outside than the second segment 22, the third segment 23, the fourth segment 24, the fifth segment 25, the sixth segment 26, and the seventh segment 27 of the upside reflection surface 2U); and the fixed reflection surface for second light distribution pattern, which is more outside than the fixed reflection surface for first light distribution pattern of the second fixed reflection surface (the first segment 21 and the eighth segment 28 that are more outside than the second segment 22, the third segment 23, the fourth segment 24, the fifth segment 25, the sixth segment 26, and the seventh segment 27 of the downside reflection surface 2D). As a result, the vehicle lighting device 1 in the first embodiment is capable of eliminating a dark part between: the fixed reflection surfaces for second light distribution pattern, which are more outside than the fixed reflection surfaces for first light distribution pattern of the first fixed reflection surface (i.e., the first segment 21 and the eighth segment 28 of the upside reflection surface 2U); and the fixed reflection surfaces for second light distribution pattern, which are more outside than the fixed reflection surfaces for first light distribution pattern of the second fixed reflection surface (i.e., the first segment 21 and the eighth segment 28 of the downside reflection surface 2D). In other words, the vehicle lighting device 1 in the first embodiment is capable of substantially entirely illuminating: the fixed reflection surfaces for second light distribution pattern of the first fixed reflection surface (the first segment 21 and the eighth segment 28 of the upside reflection surface 2U); fixed reflection surfaces for second light distribution pattern of the second fixed reflection surface (the first segment 21 and the eight segment 28 of the downside reflection surface 2D); and the intermediate invalid reflection surface 9, 9L, 9R between the fixed reflection surfaces for second light distribution pattern, which are more outside than the fixed reflection surfaces for first light distribution pattern of the first fixed reflection surface (the first segment 21 and the eighth segment 28 of the upper reflection surface 2U), and the fixed reflection surfaces for second light distribution pattern, which are more outside than the fixed reflection surfaces for first light distribution pattern of the second fixed reflection surface (the first segment 21 and the eighth segment 28 of the downside reflection surface 2D). In this manner, the vehicle lighting device 1 in the first embodiment is improved in quality, is also improved in visual recognition property, and further, is improved in appearance, in comparison with the conventional vehicle lighting device in which a nonluminous dark part may be formed.

In particular, according to the vehicle lighting device 1 in the first embodiment, the additional reflection surfaces 9UL, 9UR, 9DL, 9DR are positioned in a range other than a high energy range Z3 in energy distribution of the semiconductor-type light sources 5U, 5D of the movable reflectors 13U, 13D when they are positioned in the second location. As a result, according to the vehicle lighting device 1 in the first embodiment, when the movable reflectors 13U, 13D are positioned in the second location, the light with high energy in energy distribution of the semiconductor-type light source 5U, 5D is disallowed to be interfered with the additional reflection surfaces 9UL, 9UR, 9DL, 9DR (protrusive portions formed in the shape of small squares in which the additional reflection surfaces 9UL, 9UR, 9DL, 9DR are provided at interior faces by means of reflection surface processing) from being reliably incident to a respective one of the fixed reflection surfaces for second light distribution pattern of the first fixed reflection surface and the second fixed reflection surfaces (the first segment 21 and the eighth segment 28 of the upside reflection surface 2U and the downside reflection surface 2D) and the movable reflection surfaces for second light distribution pattern of the first movable reflection surface and the second movable reflection surface (the upside reflection surface 12U and the downside reflection surface 12D). Thus, according to the vehicle lighting device 1 in the first embodiment, when the movable reflectors 13U, 13D are positioned in the second location, the light with high energy in energy distribution of the semiconductor-type light sources 5U, 5D is reliably incident to a respective one of the fixed reflection surface for second light distribution pattern of the first fixed reflection surface and the second fixed reflection surface (the first segment 21 and the eighth segment 28 of the upside reflection surface 2U and the downside reflection surface 2D) and the movable reflection surface for second light distribution pattern of the first movable reflection surface and the second movable reflection surface (the upside reflection surface 12U and the downside reflection surface 12D). Thus, the light quantity (lightness, luminance, luminous flux) of the predetermined second light distribution patterns (light distribution patterns HP1, HP2, HP3, LP1 for high beam, shown in FIG. 28) is disallowed be decreased by means of the additional reflection surfaces 9UL, 9UR, 9DL, 9DR (the protrusive portions formed in the shape of small squares in which the additional reflection surfaces 9UL, 9UR, 9DL, 9DR are provided at interior faces by means of reflection surface processing).

Moreover, according to the vehicle lighting device 1 in the first embodiment, the additional reflection surfaces 9UL, 9UR, 9DL, 9DR (the protrusive portions formed in the shape of small squares in which the additional reflection surfaces 9UL, 9UR, 9DL, 9DR are provided on interior faces by means of reflection surface processing) are positioned in a range other than a high energy range Z3 in energy distribution of the semiconductor-type light sources 5U, 5D of the movable reflectors 13U, 13D when they are positioned in the second location. As a result, according to the vehicle lighting device 1 in the first embodiment, when the movable reflectors 13U, 13D are positioned in the first location, the light beams from the semiconductor-type light sources 5U, 5D are disallowed to be interfered with the additional reflection surfaces 9UL, 9UR, 9DL, 9DR (the protrusive portions formed in the shape of small squares in which the additional reflection surfaces 9UL, 9UR, 9DL, 9DR are provided on interior faces by means of reflection surface processing) from being incident to a respective one of the fixed reflection surfaces for first light distribution pattern of the first fixed reflection surface and the second fixed reflection surface (the first segment 21 and the eighth segment 28 that are more outside than the second segment 22, the third segment 23, the fourth segment 24, the fifth segment 25, the sixth segment 26, and the seventh segment 27 of the upside reflection surface 2U and the downside reflection surface 2D). In this manner, according to the vehicle lighting device 1 in the first embodiment, when the movable reflectors 13U, 13D are positioned in the first location, the light beams from the two semiconductor-type light sources 5U, 5D are reliably incident to a respective one of the fixed reflection surfaces for first light distribution pattern of the first fixed reflection surface and the second fixed reflection surface (the first segment 21 and the eighth segment 28 that are more outside than the second segment 22, the third segment 23, the fourth segment 24, the fifth segment 25, the sixth segment 26, and the seventh segment 27 of the upside reflection surface 2U and the downside reflection surface 2D). Thus, the light quantity (lightness, luminance, luminous flux) of a predetermined first light distribution pattern (the light distribution pattern LP for low beam, shown in FIG. 27) is disallowed to be decreased by means of the additional reflection surfaces.

According to the vehicle lighting device 1 in the first embodiment, the fixed reflector 3 and the movable reflectors 13U, 13D are formed in the shape of a substantially rotating parabolic face, so that a part L6 of the light beams that are radiated from the semiconductor-type light sources 5U, 5D can be cross-reflected easily and reliably on the intermediate invalid reflections 9, 9L, 9R by means of the additional reflection surfaces 9UL, 9UR, 9DL, 9DR.

Second Embodiment (Configuration of the Vehicle Lighting Device)

Figure 29:
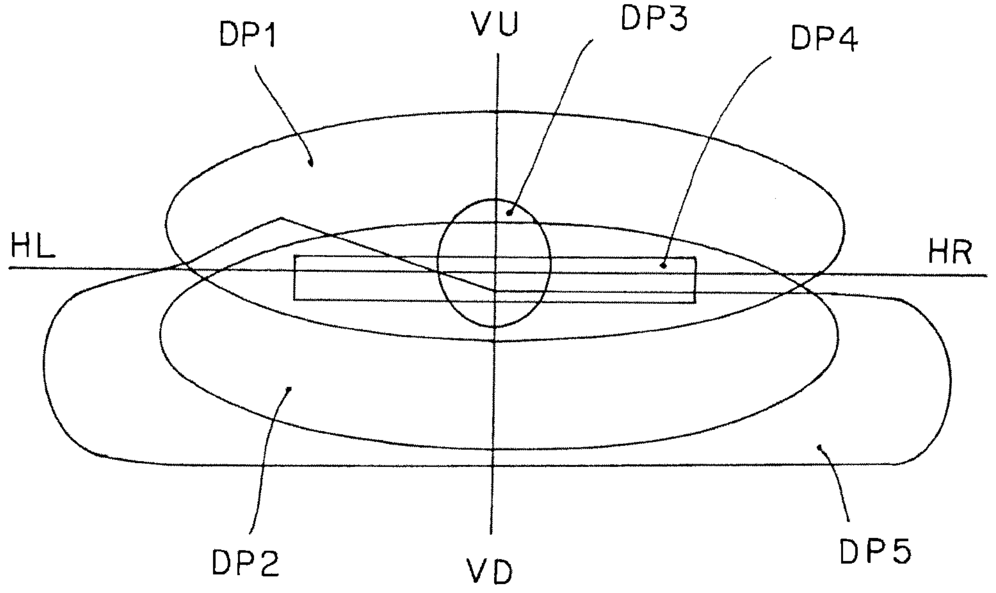
FIG. 29 shows a second embodiment of a vehicle lighting device according to the present invention, and is an explanatory view showing a light distribution pattern for daytime running light.

FIG. 29 shows a second embodiment of a vehicle lighting device according to the present invention. Hereinafter, the vehicle lighting device in the second embodiment will be described. In the figure, like constituent elements shown in FIG. 1 to FIG. 28 are designated by like reference numerals.

According to the vehicle lighting device 1 in the first embodiment, when the movable reflectors 13U, 13D are positioned in the second location, the light distribution patterns HP1, HP2, HP3, LP1 for high beam are obtained. On the other hand, according to the vehicle lighting device in the second embodiment, when the movable reflectors 13U, 13D are positioned in at least the second location, i.e., when the movable reflectors 13U, 13D are positioned in the second location, the light distribution patterns HP1, HP2, HP3, LP1 for high beam are obtained as described previously and when the movable reflectors 13U, 13D are positioned in a third location (the position proximal to the second location), light distribution patterns DP1, DP2, DP3, DP4, DP5 for daytime running light are obtained as shown in FIG. 29.

The foregoing first and second embodiments describe a light distribution pattern LP for low beam. However, in the present invention, there may be a light distribution pattern other than the light distribution pattern LP for low beam, for example, a light distribution pattern having an oblique cutoff line on a driving lane side and a horizontal cutoff line on an opposite lane side with an elbow point being a turning point, such as a light distribution pattern for expressway or a light distribution pattern for fog lamp.

In addition, the foregoing first and second embodiments describe a vehicle lighting device 1 for left side driving lane. However, the present invention can be applied to a vehicle lighting device for right side driving lane.

Further, in the foregoing first and second embodiments, the light distribution pattern LP for low beam, shown in FIG. 27, and the light distribution patterns HP1, HP2, HP3, LP1 for high beam, shown in FIG. 28, are switched to each other by using the movable reflectors 13U, 13D, or alternatively, there are switched to each other the light distribution pattern LP for low beam, shown in FIG. 27; the light distribution patterns HP1, HP2, HP3, LP1 for high beam, shown in FIG. 28; and the light distribution patterns DP1, DP2, DP3, DP4, DP5 for daytime running light, shown in FIG. 29. However, in the present invention, only the light distribution patterns HP1, HP2, HP3, LP1 for high beam, shown in FIG. 28, or the light distribution patterns DP1, DP2, DP3, DP4, DP5 for daytime running light, shown in FIG. 29, may be obtained by means of only the fixed reflector 3 without use of the movable reflectors 13U, 13D. In this case, an additional reflection surface is provided in a range other than a high energy range Z3 in energy distribution of the semiconductor-type light sources 5U, 5D of the fixed reflector 3, i.e., in a range of an X-axis side more than the double-dotted chain line, as shown in FIG. 17.

Furthermore, the foregoing first and second embodiments describe a headlamp (a vehicle headlamp) which is adapted to switch the light distribution pattern LP for low beam, shown in FIG. 27, and the light distribution patterns HP1, HP2, HP3, LP1 for high beam, shown in FIG. 28, to each other, or alternatively, to switch the light distribution pattern LP for low beam, shown in FIG. 27; the light distribution patterns HP1, HP2, HP3, LP1 for high beam, shown in FIG. 28; and the light distribution patterns DP1, DP2, DP3, DP4, DP5 for daytime running light, shown in FIG. 29, to each other. However, the present invention can be applied to a lamp other than a fog lamp, a tail lamp, or a stop lamp other than the headlamp.

What is claimed is:

1. A vehicle lighting device which is comprised of two light source/reflection surface units, said device comprising:

a first light source/reflection surface unit which is comprised of a first semiconductor-type light source and a first reflection surface for reflecting and emitting light from the first semiconductor-type light source as a predetermined light distribution pattern;

a second light source/reflection surface unit which is comprised of a second semiconductor-type light source and a second reflection surface for reflecting and emitting light from the second semiconductor-type light source as a predetermined light distribution pattern;

a holder which is disposed between the first light source/reflection surface unit and the second light source/reflection source unit and by which the first light source/reflection surface unit and the second light source/reflection surface unit are held;

an intermediate invalid reflection surface which is continuously provided between the first reflection surface and the second reflection surface and to which the light from the first semiconductor-type light source and the light from the second semiconductor-type light source are disallowed to be incident; and an additional reflection surface for reflecting to the intermediate invalid reflection surface, the light from the first semiconductor-type light source and the light from the second semiconductor-type light source.

2. The vehicle lighting device according to claim 1, wherein:

the first reflection surface is made of: a first fixed reflection surface which is provided at a fixed reflector; and a first movable reflection surface which is provided at a movable reflector;

the second reflection surface is made of: a second fixed reflection surface which is provided at a fixed reflector; and a second movable reflection surface which is provided at a movable reflector;

the first fixed reflection surface and the second fixed reflection surface are comprised of: a fixed reflection surface for first light distribution pattern, for reflecting and emitting a predetermined first light distribution pattern, when the movable reflector is positioned in a first location; and a fixed reflection surface for second light distribution pattern, for reflecting and emitting a predetermined second light distribution pattern, when the movable reflector is positioned in a second location;

the first movable reflection surface and the second movable reflection surface are comprised of a movable reflection surface for second light distribution pattern, for reflecting and emitting a predetermined second light distribution pattern, when the movable reflector is positioned in a second location;

the intermediate invalid reflection surface is continuously provided between the fixed reflection surface for the second light distribution pattern, which is more outside than the fixed reflection surface for first light distribution pattern of the first fixed reflection surface, and the fixed reflection surface for the second light distribution pattern, which is more outside than the fixed reflection surface for first light distribution pattern of the second fixed reflection surface; and the additional reflection surface is positioned in a range other than a high energy range in energy distribution of the first semiconductor-type light source and the second semiconductor-type light source of the movable reflector, when the movable reflector is positioned in the second location.

3. The vehicle lighting device according to claim 1, wherein:

the first reflection surface is made of a first fixed reflection surface which is provided at a fixed reflector;

the second reflection surface is made of a second fixed reflection surface which is provided at a fixed reflector;

the first fixed reflection surface and the second fixed reflection surface are comprised of a reflection surface for reflecting and emitting a predetermined light distribution pattern;

the intermediate invalid reflection surface is continuously provided between the first fixed reflection surface and the second fixed reflection surface; and the additional reflection surface is positioned in a range other than a high energy range in energy distribution of the first semiconductor-type light source and the second semiconductor-type light source, of the fixed reflector.

4. The vehicle lighting device according to claim 2, wherein the fixed reflector and the movable reflector is formed in a shape of a rotating parabolic face.

5. The vehicle lighting device according to claim 3, wherein the fixed reflector is formed in a shape of a rotating parabolic face.

6. The vehicle lighting device according to claim 2, wherein the additional reflection surface and the intermediate invalid reflection surface are arranged such that the light from the first semiconductor-type light source and the light from the second semiconductor-type light source are reflected from the additional reflection surface to the intermediate invalid reflection surface, and then reflected from the intermediate invalid reflection surface in a forward direction.

* * * * *